(12) United States Patent
Phillips et al.

(10) Patent No.: US 8,164,810 B2
(45) Date of Patent: Apr. 24, 2012

(54) SECURITY DEVICES INCORPORATING OPTICALLY VARIABLE ADHESIVE

(76) Inventors: Roger W. Phillips, Santa Rosa, CA (US); Thomas Mayer, Bogart, GA (US); Scott Lamar, Santa Rosa, CA (US); Neil Teitelbaum, Ottawa (CA)

(*) Notice: Subject to any disclaimer, the term of this patent is extended or adjusted under 35 U.S.C. 154(b) by 621 days.

(21) Appl. No.: 11/682,059

(22) Filed: Mar. 5, 2007

(65) Prior Publication Data

US 2007/0206249 A1    Sep. 6, 2007

Related U.S. Application Data

(60) Provisional application No. 60/744,842, filed on Apr. 14, 2006, provisional application No. 60/832,826, filed on Jul. 24, 2006, provisional application No. 60/861,608, filed on Nov. 29, 2006, provisional application No. 60/779,484, filed on Mar. 6, 2006.

(51) Int. Cl.
*G03H 1/00* (2006.01)

(52) U.S. Cl. .......................................................... 359/2

(58) Field of Classification Search ........................ None
See application file for complete search history.

(56) References Cited

U.S. PATENT DOCUMENTS

| | | | |
|---|---|---|---|
| 4,186,943 A | 2/1980 | Lee | |
| 4,244,998 A | 1/1981 | Smith | |
| 4,434,010 A | 2/1984 | Ash | |
| 5,002,312 A | 3/1991 | Phillips et al. | |
| 5,059,245 A | 10/1991 | Phillips et al. | |
| 5,135,812 A | 8/1992 | Phillips et al. | |
| 5,171,363 A | 12/1992 | Phillips et al. | |
| 5,186,787 A | 2/1993 | Phillips et al. | |
| 5,279,657 A | 1/1994 | Phillips et al. | |
| 5,314,767 A | 5/1994 | Bussard | |
| 5,364,689 A | 11/1994 | Kashiwagi et al. | 428/195.1 |
| 5,686,504 A | 11/1997 | Ang | |
| 5,700,550 A | 12/1997 | Uyama et al. | |
| 6,114,018 A | 9/2000 | Phillips et al. | |
| 6,616,190 B1 | 9/2003 | Jotcham | |
| 6,692,830 B2 | 2/2004 | Argoitia et al. | |
| 6,838,166 B2 | 1/2005 | Phillips et al. | 428/323 |
| 6,841,238 B2 | 1/2005 | Argoitia et al. | |
| 6,987,590 B2 | 1/2006 | Phillips et al. | |
| 7,005,178 B2 | 2/2006 | Bonkowski et al. | |
| 7,029,745 B2 | 4/2006 | Bonkowski et al. | |
| 7,047,883 B2 | 5/2006 | Raksha et al. | |

(Continued)

FOREIGN PATENT DOCUMENTS

CA    2163528    12/1998

(Continued)

OTHER PUBLICATIONS

Notification of the First Office Action on Chinese Patent Publication No. 101058285, Nov. 6, 2009, pp. 1-2.

(Continued)

*Primary Examiner* — Derek S Chapel
(74) *Attorney, Agent, or Firm* — Matthew A. Pequignot; Pequignot + Myers LLC

(57) ABSTRACT

A structure for providing an optical effect includes first and second substrates hot stamped together by an adhesive. The adhesive includes an energy activated binder having a plurality of particles distributed therein or thereon for providing the optical effect detectable through the first substrate. The particles may be optically variable flakes, thin film light interference flakes, diffractive flakes, and reflective flakes.

22 Claims, 17 Drawing Sheets

U.S. PATENT DOCUMENTS

| | | |
|---|---|---|
| 7,054,042 B2 | 5/2006 | Holmes et al. |
| 7,081,819 B2 | 7/2006 | Martinez et al. |
| 7,089,420 B1 * | 8/2006 | Durst et al. .................. 713/176 |
| 2004/0180168 A1 * | 9/2004 | Rancien et al. .............. 428/40.1 |
| 2005/0106367 A1 | 5/2005 | Raksha et al. |
| 2005/0127663 A1 | 6/2005 | Heim |
| 2005/0128543 A1 | 6/2005 | Phillips et al. |
| 2005/0181166 A1 * | 8/2005 | Rancien ....................... 428/41.9 |
| 2005/0189060 A1 | 9/2005 | Huang et al. .................... 156/99 |
| 2006/0035080 A1 | 2/2006 | Argoitia et al. |
| 2006/0077496 A1 | 4/2006 | Argoitia et al. |
| 2006/0255586 A1 | 11/2006 | Lazzerini |
| 2006/0285184 A1 | 12/2006 | Phillips et al. |

FOREIGN PATENT DOCUMENTS

| | | |
|---|---|---|
| EP | 0453131 | 10/1991 |
| EP | 1174278 | 1/2002 |
| EP | 1 353 197 | 10/2003 |
| EP | 1516957 | 3/2005 |
| EP | 1529653 | 5/2005 |
| EP | 1 741 757 | 1/2007 |
| WO | 01/07268 | 2/2001 |
| WO | 02/04234 | 1/2002 |
| WO | WO2004014665 | 4/2004 |
| WO | WO 2005/017048 | 2/2005 |

OTHER PUBLICATIONS

Influence of Nanosized Metal Clusters on the Generation of Strong Colors and Controlling of their Properties through Physical Vapor Description (PVD), R. Domnick et al, $49^{th}$ Annual Technical Conf. Proceedings 2006, Society of Vacuum Coaters.

"Optical Document Security", Third edition, Rudolf L. van Renesse, pp. 40, 218-219, 352, 2005.

* cited by examiner

SECURITY DEVICES INCORPORATING OPTICALLY VARIABLE ADHESIVE

CROSS-REFERENCE TO RELATED APPLICATION

The present application claims priority from U.S. Provisional Application No. 60/744,842 filed on Apr. 14, 2006; U.S. Provisional Application No. 60/779,484 filed on Mar. 6, 2006; U.S. Provisional Application No. 60/832,826 filed on Jul. 24, 2006; and U.S. Provisional Application No. 60/861,608 filed on Nov. 29, 2006. All patents and patent applications mentioned heretofore and hereafter are incorporated herein by reference, for all purposes.

This application is related to U.S. patent application Ser. No. 11/273,985 filed Nov. 15, 2005, which is a continuation-in-part application of U.S. patent application Ser. No. 10/666,318 filed on Sep. 18, 2003, now U.S. Pat. No. 6,987,590 issued on Jan. 17, 2006 entitled "Patterned Reflective Optical Structures"; U.S. Provisional Application No. 60/673,080 filed on Apr. 20, 2005 entitled "Patterned Reflective Optical Structures"; and U.S. Provisional Application No. 60/729,907 filed Oct. 25, 2005 entitled "Patterned Optical Structures With Enhanced Security Feature" which are all incorporated herein by reference for all purposes.

FIELD OF THE INVENTION

This invention relates generally to hot-stamping and more particularly, to the hot-stamping of an optical device with a hot-stamp adhesive having optical effect flakes to a substrate or article.

BACKGROUND OF THE INVENTION

The term Chromagram used hereafter is meant to include optical structures that have a patterned or windowed substrate together with special effect coatings or layers supported by or supporting the patterned or windowed substrate. Chromagrams of various designs are described in US Patent Application Publication No. 2006/0285184, and used as security devices or for enhancing the security of products and for their aesthetic appeal.

One type of Chromagram is an optical structure that exhibits the effects of surface relief patterns, such as holograms or diffractive gratings, together with a pattern such as alphanumeric characters, bar codes, or graphical or pictorial designs, and additional optical effects in the regions around such pattern. Such structures are described in US Patent Application Publication No. 2006/0077496 in the name of Argoitia et al. published Apr. 13, 2006, referred to hereafter as '496. Another Chromagram-type structure is described in US Patent Application Publication No. 2005/0128543 in the name of Phillips et al. In '496 patterned substrates having windowed regions that one can see through, are coated with optically variable (OV) coatings or optically variable inks that can be seen through the windows. For all intents and purposes, all references described heretofore or hereafter are incorporated herein by reference.

By use of the term "patterned" layer, it is meant that a reflective, opaque, or partially transmissive layer is applied over a substrate which may be planar or have a surface relief pattern therein, in a manner that forms a desired "pattern" or design. By way of non-limiting examples, the patterned reflective layer can be formed in the shape of letters, numerals, bar codes and/or graphical or pictorial designs.

One type of the surface relief pattern is a demetalized (demet) hologram described in U.S. Pat. Nos. 5,314,767, 6,616,190, and 7,081,819. To enhance the security of holograms and to prevent contact copies being made, a technique was developed for making holograms by a process of demetallization. Demetalized holograms and patches are used in passports and ID cards to protect photographs and data.

Although not limited thereto, this invention primarily relates to types of Chromagrams, made with optical and, or, magnetic effect hot stamp adhesive having flakes and/or colorant therein. Heretofore, a desirous quality of adhesives used to bond two substrates together, wherein one substrate is to be seen through the other, has been for the adhesive to be substantially transparent and having required bonding properties. Therefore the goal has been to have an adhesive that "appears" to be as invisible as possible, and substantially matched in refractive index to the substrates with which it is bonding, thereby substantially un-affecting light passing therethrough.

Hot stamp transfer foils have been provided in conjunction with hot stamp machines to affix images onto various substrates such as paper, plastic film and even rigid substrates. Hot stamping is a dry process. One commercially available machine for hot stamping images onto substrates is the Malahide E4-PK produced by Malahide Design and Manufacturing Inc. Machines of this type are shown and described on the Internet at www.hotstamping.com. Simplistically, in a hot-stamping process, a die is attached to the heated plate which is pressed against a load roll of hot stamping foil to affix the foil to an article or substrate. A roll on transfer process could also be used in this invention. In this case, the article substrate and the adhesive (UV or heat activated) is brought together at a nip to effect the transfer of the hot stamp layer to the article substrate.

An image is typically formed by utilizing a metal or silicone rubber die into which the desired image has been cut. This die is placed in the hot stamping machine and is used to press the image into hot stamp foil utilizing a combination of heat and pressure. The back side of the foil is generally coated with a dry heat activated, thermo set adhesive, for example an acrylate based adhesive. Upon the application of heat, the adhesive becomes tacky in regions of the heated image and adheres to the paper or plastic substrate.

Hot stamping is described or mentioned in the U.S. Pat. Nos. 5,002,312, 5,059,245, 5,135,812, 5,171,363, 5,186,787, 5,279,657 and 7,005,178, in the name of Roger Phillips of Flex Products Inc. of Santa Rosa Ca. Additional details of a hot stamping process may be found on pages 440-445 of the Modern Plastics Encyclopedia, 1979-1980.

Aforementioned U.S. Pat. No. 5,059,245 describes forming an optical coating upon a substrate wherein the optical coating in one embodiment comprises optically variable flakes applied within a carrier as paint or ink which is then dried or cured upon the substrate.

Optical effect flakes in an adhesive may have one or more predetermined optical characteristics; for example, flakes may be optically variable changing color with a change in angle of incident light, or flakes may be diffractive, or may have covert symbols therein or thereon, or the flakes may simply be reflective or absorptive. In some instances, optical effect flakes have a combination of optical effects, for example they may be diffractive and color shifting, or they may be diffractive and reflective, or diffractive and highly absorptive depending upon the desired effect. Furthermore flakes having different optical effects may be mixed together in desired ratios. Pigments that may be added include those based on interference, for example mica based pigments, Fabry Perot type pigments, liquid crystal type pigments, including those that color shift with viewing angle, non-shifting pigments like gold and nickel, and other metallic flakes. Dyes and or other pigments may be added to the adhesive to modify the colors of the interference and/or diffractive pigments, including covert platelets, known as charms or taggants, and other shaped particles. The examples of covert flakes include, but not limited to, charms or taggants as taught in US Patent Application Publication No. 2006/0035080 incorporated herein by reference, shaped pigments as disclosed in US Patent Application Publication No. 2006/0035080, magnetic flakes, fluorescent pigments, standard UV activated to form visible light, or specialized anti-Stokes materials UV activated to form visible light.

Heretofore, in instances when a layer of material such as an ink coated substrate having optically variable flakes therein was hot stamped to another substrate or object, prior to hot stamping, a heat-activated adhesive layer, typically 2-20 microns thick, was applied to the substrate or object to adhere the layer of material to the substrate or object by applying suitable heat and pressure.

In relation to FIGS. 1a and 1b, U.S. Pat. No. 7,029,745 teaches a method of affixing a security article, such as security article 30, to a carrier substrate 66 through a hot-stamping process. FIG. 1a shows security article 30 with a release layer 62 formed on one side of a light transmissive substrate 24, such as an acrylic coating with an interference pattern formed thereon. The release layer 62 allows security article 30, including substrate 24, absorber layer 18, dielectric layer 20 with optical interference pattern 15, and reflector layer 22, to be released from carrier structure 64 during the hot-stamping process.

As shown in FIG. 1b, a release layer 62 and carrier structure 64 are removed when security article 30 has been applied to an object such as a carrier substrate 66 by hot-stamping, with security article 30 being coupled to carrier substrate 66 by way of adhesive layer 68. Sometimes the release stays with the substrate 62. The bonding of adhesive layer 68 against carrier substrate 66 occurs as a heated metal stamp (not shown) comes into contact with carrier structure 64. The heated metal stamp simultaneously forces adhesive layer 68 against carrier substrate 66 while heating adhesive layer 68 to more effectively bond to carrier substrate 66. Furthermore, the heated metal stamp softens release layer 62 thereby aiding in releasing security article 30 from carrier structure 64 which is subsequently discarded. Once security article 30 has been attached to carrier substrate 66, the image produced by security article 30 is viewed from substrate 24 toward optical coating 16.

In the field of hot-stamping, a plurality of commercially available adhesives have been developed to provide required adhesion of foils to same and other materials, under heat and pressure. Although these heat-activated adhesives have performed their intended function, they have not provided additional functions now perceived to be highly useful.

For example, the inventors of this invention have discovered that these dry heat activated adhesives can be applied to a substrate and can be preloaded or premixed into the adhesive with special optical effect flakes, such as magnetic flakes, magnetically alignable flakes, magnetic flakes with color shifting properties, color shifting flakes, color switching flakes, diffractive flakes and or covert flakes bearing indicia also known as charms.

It is an object of this invention to provide a hot stamp adhesive, that has therein, special effect flakes, and wherein the flakes can be seen through one or more layers the adhesive is bonding. It was not anticipated that acceptable adhesion would result when optically variable pigment was added to the hot stamp adhesive. The adhesive could also be printed in a pattern so as to affect a patterned transfer even though a flat die would be used to make the hot stamp transfer. Printing the adhesive rather than having an image in the die of the hot stamper results in a better transferred image with higher definition without "fringe" often seen in foil type transfers. Fringe refers to the ragged edges of the foil image when hot stamped onto surface of paper, for example. The problem is evident often in the hot stamp transfer of the letter "A" where the triangle of the letter "A" is covered with foil.

It is an object of the invention, to provide a Chromagram where the provision of a discrete special effect layer is obviated, by adding special effect flakes to a hot-stamp adhesive for to bond two objects together. This makes for a product that easier to manufacture and reduces manufacturing costs.

It is an object of this invention to hot stamp a substrate to another substrate or object, wherein optical effect adhesive bearing optical effect flakes is solely used as an adhesive.

Security threads have been known for some time. U.S. Pat. No. 4,186,943 to Lee describes a windowed security thread that is contained within the banknote paper. Lee uses diachronic coatings, in all-dielectric optical stack, having a symmetrical design so that the same reflected and transmitted color and color shift is seen from either side of the paper through elongate windows of the paper substrate. In one embodiment, paper is removed at various points over the embedded security thread to allow the thread to be more clearly seen. Furthermore, unfortunately, counterfeiters have at their disposal from the packaging field commercially available transparent film made from hundreds of alternating layers of polymeric films that display similar color shifting and reflection and transmission characteristics as found in '943. See http://www.ptonline.com/articles/200603fa1.html. This makes foils based on all-dielectric suspect as an anti-counterfeit system. US Patent Application Publication No. 2006/0255586 by Lazzerini describes a security device composed of holographic regions with a continuous metal layer of aluminum but with variations in its thickness. In co-pending application, WO2004014665 by Lazzerini, the method of "thinning" the deposited aluminum is by chemical etching after some areas of the aluminum are protected by a transparent ink adapted to preserve the aluminum by the attacks of acid substances. The aluminum is thinned from an optical density of 1.8, transmission of 1.6%, down to 0.7 optical density or about 20% transmission, in the "A" portion, item 3 of the '586 patent application. In other words, the aluminum is opaque in areas other than the "A" portion and only semi-transparent in the "A" areas. The use of magnetic elements in register with the holographic elements is mentioned but does not indicate the nature of the magnetic elements. Another version of the invention uses color shifting ink between the backing layer of Polyethylene Terephtalate (PET) and the continuous aluminum metal layer. The type of color shifting ink is not defined—they could be mica based transparent color shift with angle pigments, or liquid crystal color shift inks both of which are transparent—in our invention the pigment is opaque). At any rate, Lazzerini does not teach a color shift material based on Optically Variable Adhesive (OVA), does not have color shift from both sides of the security thread, does not have covert charms, and has no-demet areas in the holographic regions and does not have magnetic elements confined within the color shift pigment.

U.S. Pat. No. 7,054,042 to Holmes et al., hereinafter referred to as '042, disclosed a device employing a demet hologram with a thin film color shifter underneath. The use of a thin film interference filter has a large drawback in terms of color control because the methods employed, vacuum deposition methods, particularly, those that are of such running speeds to make them commercially viable has at best a plus/minus 2% error on the dielectric layer thickness. For a Fabry Perot structure as discussed in '042, a typical design would be Al opaque/Low index i.e. MgF2/absorber Cr 3 nm. With a 2% variation for a 4 QW optical thickness at 550 nm, this thickness variation translates into a delta E color of 27 units and at 6 QW optical thickness at 550 nm translates into a delta E color of 31. From a practical point of view, this color variation makes the distinction between the genuine product and a counterfeit problematical. The only hope to improve the color of a foil with a vacuum process is to have extensive editing which only leads to high a high expensive product.

U.S. Pat. No. 5,700,550 to Uyama teaches the use of an all dielectric optical stack on a holographic forming layer, which has even less control of color than '042, since the structure disclosed by Uyama has five layers of alternating ZnS and MgF2 or TiO2 and SiO2. Each layer is subject to a 2% variation which would result in even larger color variation. Uyama also requires that the device be placed on a black background otherwise if placed on a white substrate the transmissive nature of his device will result in light beams combining from light reflecting from the substrate back through the device with the reflected light beam from the interference stack to produce white light again. Even if the substrate (i.e. currency paper were colored) the light recombination would give low chroma.

The aim of this invention is to eliminate the drawbacks of the prior art so that a new security device having the desired characteristics of a thread for banknotes or other paper documents or even a plastic document have a layered system of counterfeit deterrence that can be manufactured with high quality of color control, along with visible and covert features as well protection for durability on both sides of the device while maintaining a minimum thickness. Therefore, the problem that is being addressed is to provide a new security thread with enhanced features that can easily be assembled. The problem is solved by giving the viewer security features that can be remembered, that has a distinct color shift and covert features for machine or forensic analysis.

It is an object of the invention to provide a simplified multi-layered security device using an optically variable adhesive (OVA).

It is an object of the invention, to provide a thin asymmetric security thread displaying different optical effects when viewed from different sides.

It is another object of the invention, to provide a thin security device with high chroma and high color control.

It is another object of the invention, to provide a thin security thread comprising a demet hologram and covert taggents therein.

It is another object of this invention, to provide a hot stamp image with multilayer security features.

SUMMARY OF THE INVENTION

In accordance with this invention a structure for providing an optical effect is provided, comprising a first substrate and a second substrate affixed to the first substrate by an adhesive alone, wherein the adhesive comprises an energy activated binder having a plurality of particles distributed therein or thereon for providing the optical effect detectable through the first substrate.

It should be understood the second substrate can be any object to which the first substrate can be affixed, for example by hot stamping.

In accordance with another aspect of the invention, a method of forming an article for providing an optical effect is provided comprising the steps of:
  a) providing a first substrate having at least a first optical effect;
  b) coating the first substrate with a carrier vehicle having optical effect particles therein or thereon, wherein the particles provide a second optical effect detectable through the first substrate; and
  c) hot stamping the coated first substrate to a second substrate or article so that the carrier vehicle is solely used as an adhesive in the hot stamping.

BRIEF DESCRIPTION OF THE DRAWINGS

Exemplary embodiments of the invention will now be described, in conjunction with the drawings, in which.

DETAILED DESCRIPTION

Figure 1A:
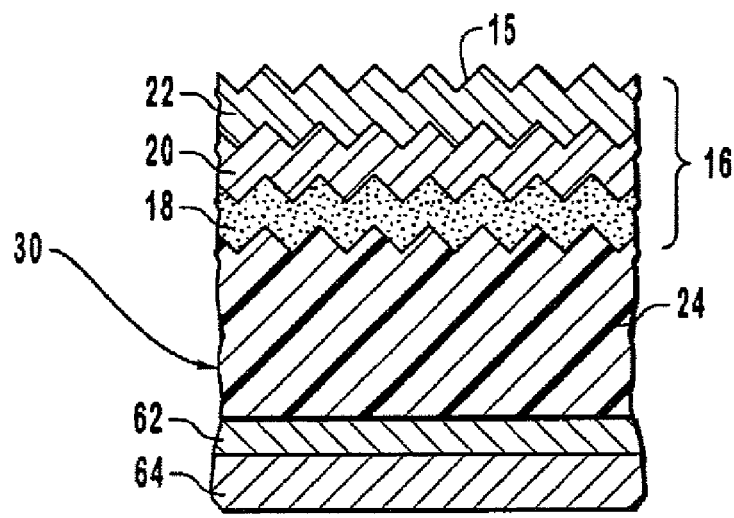
FIG. 1a is a schematic view of a security article before hot-stamping, according to the prior art.
Figure 1B:
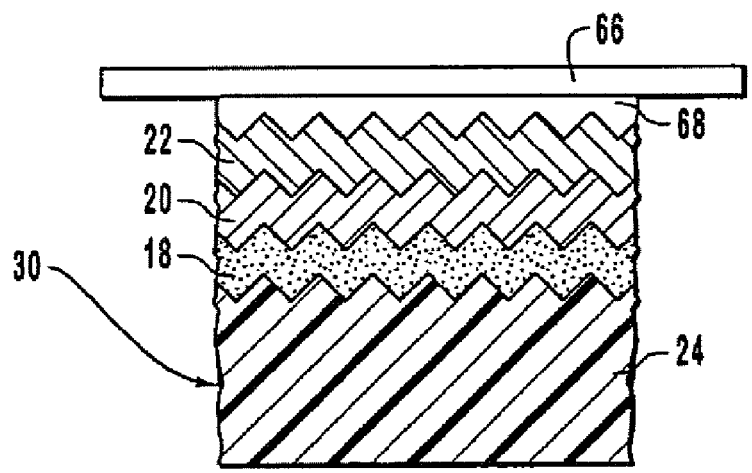
FIG. 1b is a schematic view of a security article shown in FIG. 1a hot-stamped to a carrier substrate, according to the prior art.

For the purpose of this application, the term "energy activated adhesive" or "energy activated binder", means a bonding substance that requires an energy source for curing. The energy activated adhesives include, but are not limited to, hot stamp adhesives, UV activated adhesives, thermoplastic and thermoset adhesives, paint-based polymeric compositions, varnishes, and staining compositions. By way of example, an adhesive is selected from the group of: polymethacrylate, polyacrylate, polyamide, nitrocellulose, alkyd resin, polyvinyl alcohol, polyvinyl acetate, and polyurethane.

The methods of activating the adhesives include hot stamping, UV curing, applying heat, or a beam of electrons. For brevity, an energy activated adhesive, possibly with special flakes therein, is referred to as "an adhesive" hereinbelow where it does not lead to confusion.

As was described heretofore, in the background of the invention, the field of hot stamping and more particularly, hot stamping of one optical coating or substrate with another is well known. For example, coated substrates bearing images, logos or other indicia are hot stamped onto lottery cards, passports, banknotes, driver's licenses, poker chips, and a variety of other articles and substrates are well known.

Although commercially available hot stamp adhesives are known to perform their intended function, the inventors of this invention serendipitously discovered that some cured paints having optically variable flakes therein serve adequately as hot stamp adhesives. Note, that the paint is no longer a paint but is now an adhesive thereby obviating the requirement or step of adding an adhesion layer of material to a paint layer having optically variable properties. Furthermore, the added benefit of having special effect flakes within the hot stamp adhesive provides enhanced structures. As well overall thinner structures may result from this method, as well as structures with a patterned adhesive layer, and structures comprising more than one layers of adhesive providing different optical effects, for example having charms in one layer, and OVP in another.

The adhesive may be printed into patterns or flood coated over the entire surface. If patterned, the product becomes more tamper proof since the product cannot be physically removed in one piece. Attempts to remove the device by dissolving the adhesive using solvents would also be detrimental since the solvent would also attack the hardcoat/release which in turn would destroy the device, making tampering obvious.

The flakes may vary considerably in size, but are preferably at least 5 microns in diameter or across their surface. Flakes can be optically variable flakes, color-shifting flakes, thin film light interference flakes, diffractive flakes, reflective flakes, light absorbing flakes, covert flakes, flakes bearing symbols or indicia, flakes that are uniform in shape, and magnetic flakes, color shift pigments, such as thin film metal-dielectric, all dielectric, mica based pigments, liquid crystal pigments etc.

The inventors also discovered that flake material such as optically variable, diffractive, absorptive, or reflective flakes or flakes having other properties such as covert features, can be added directly to conventional hot stamping adhesives prior to curing to provide both the benefits of adhesion and the optical effects which the added flakes exhibit.

Some of the devices described in this application comprise a light transmissive or essentially transparent substrate, which may be made of Polyethylene Terephtalate (PET), Oriented Polypropylene (OPP) or other suitable plastic material. By way of example, a PET layer has a thickness of 6-25 microns. It should be understood that when the description of a device contains only one substrate, a second substrate can be a protective coat, a release coat, or any document or object to which the first substrate can be affixed, by way of example a paper document or a free standing plastic film.

An optical stack, also referred to as an interference stack, comprises a reflective layer, an absorber, and a dielectric layer between the reflective layer and the absorber, as it is known in the art. A reflective layer can be made of any metal that has a reflectance over 20%, preferably aluminum. By way of example, a dielectric layer is made of $MgF_2$ or other transparent material as known in the art.

An absorber can be a grey metal with a ratio of n/k about 1, where n is the real part of the refractive index and k is the imaginary part of the reflective index, for example Cr, Ti, or Ni, or can be a non-selective absorber across the visible spectrum like TiN, or can be a cermet, as described in the article entitled "Influence of Nanosized Metal Clusters on the Generation of Strong Colors and Controlling of their Properties through Physical Vapor Deposition (PVD)" by R. Domnick et al., 49th Annual Technical Conference Proceedings (2006), Society of Vacuum Coaters, incorporated herein by reference. By way of example, a cermet material comprises silver islands in a dielectric matrix.

Some of the devices disclosed in the present application comprise a diffractive structure, which may be any relief including a hologram, a demetallized hologram, a kinegram, and a zero order diffractive structure or a simple grating structure. An embossable resin can be made of such materials as type G PET, Polycarbonate, polyvinyl chloride or polymethacrylate. An embossable layer may be combined with hardcoat/release layer. An embossing may be either patterned or continuous. A demet layer can be made of Al, Cu, Ni, and other metals and metal alloys that has been patterned by demetallization. Various techniques may be used to pattern the metal layer, such as chemical etching or oil ablation in vacuum, both done in registration with the relief image. A high refractive index layer can be made of ZnS, TiO2, ZrO2, etc.

In one embodiment of this invention, dye particles are added to the adhesive to modify the optically variable effect.

Optionally, the adhesive layer is transparent or semi-transparent and concentration of the pigment particles is adjusted so that when a security article is hot stamped to a printed document, the insignia printed on the document is visible through the security article.

In one embodiment of this invention, colorless reflective flakes are added to the adhesive, so that the flakes appear to have color, reflecting the color of the dye in the adhesive or paint or ink used as adhesive, wherein the ink is preferably made of acrylic or urethane carrier with flakes therein.

Another embodiment of this invention is a single layer of adhesive with particles providing an optical effect therein. By way of example, the particles are color-shifting flakes. This structure can be used to join two objects together, wherein one of the objects is light-transmissive to make visible optical effects provided by the adhesive.

In another embodiment of the present invention, reflective flakes bearing symbols or text, as described in co-pending US Patent Application Publication No. 2006/0035080, are added to the adhesive. These symbols stand out against a colored background when viewed under a microscope using reflected light.

In another embodiment of the present invention, a security device comprises two adhesive layers: a first layer of adhesive is dye-free and has reflective flakes therein; a second layer of adhesive is colored with a dye, so that the dye mutes or enhances the reflectance of the first layer, depending from which side the security device is viewed.

In other embodiments of the present invention fluorescent dyes activated by UV or up-conversion pigments that fluoresce when IR activated, for example by two photon absorption, are added to the adhesive as a covert feature. Nanoparticles or transparent conductive particles, for example Indium Tin Oxide (ITO) flakes, can also be added to the adhesive for covert features.

In a less preferred embodiment of the present invention, an adhesive is first applied to a substrate and then optically variable pigment (OVP) particles are added to the adhesive, for example, sprinkled or scattered by an air jet onto the adhesive surface, optionally followed by more adhesive so that a semitransparent layer of OVP is seen in the transferred product.

Although a stamping die may be utilized in some embodiments having an image formed therein, alternatively an image may already be created in the form of a de-metalized hologram. In this instance, a flat hot-stamp die is utilized to transfer the image. The transferred image may be a square or other shape as defined by the flat hot die or by the area of the adhesive.

An alternative to the hot-stamping an adhesive onto a demetalized (demet) hologram, is to print a UV activated adhesive containing the OVP particles, bring a laminating sheet containing the demet hologram onto the adhesive and then cure the adhesive by shining the UV light or e-beam radiation through the transparent backing to the adhesive sheet or e-beam radiation though the demet hologram using the e-beam curing step. UV will not work through the areas of the hologram that are not demet unless the width of the non demet areas are very narrow, estimated to be less than 2 microns, so that the UV can cure the adhesive by coming in at an angle.

Figure 2:
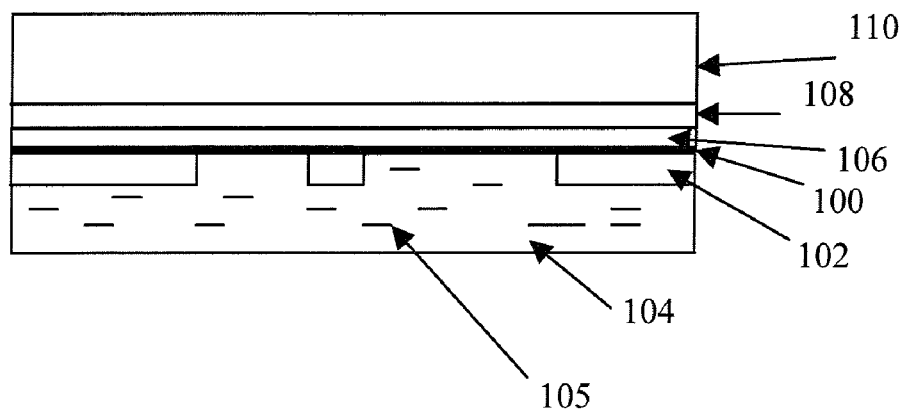
FIG. 2 is a cross-sectional view of a foil in accordance with the invention shown before transfer to an object wherein a substrate having a patterned Al layer has a dry hot stamp adhesive bottom layer having optically variable pigment (OVP) or optically variable magnetic pigment dispersed within the adhesive.

FIG. 2 shows a structure in accordance with one embodiment of the present invention. An embossed hologram layer 100 has an Al layer 102 thereon. The opaque Al coating 102 is patterned to form windows or gaps. Both the opaque Al regions 102 and gaps therebetween are coated with optically variable adhesive 104 having therein optically variable flakes 105, which can be magnetic pigment flakes shifting color with viewing angle. A resin layer 106 is formed to allow the embossing of relief surface 100, and a release (or hardcoat) layer 108 is coated onto the removable carrier substrate 110, typically PET 10-25 microns in thickness. In another embodiment, the release and hardcoat/resin layers are combined into one layer.

Figure 3:
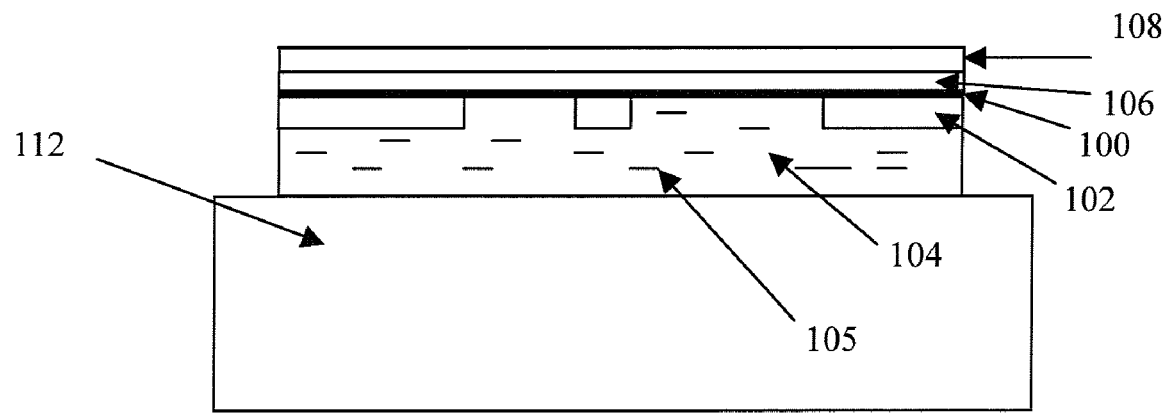
FIG. 3 is cross-section of a Chromagram with optically variable adhesive after hot stamp transfer onto a paper or cardboard substrate.

FIG. 3 shows the structure of FIG. 2 hot stamped to a paper or cardboard substrate 112. When the PET layer 110 is removed and the structure is viewed from the top looking down through the hard coat 108, through the holographic patterned Al layers, color shifting coating is seen through the windows. What makes this structure particularly ideal is the synergy that is attained by combining special effect pigments in the adhesive material, obviating the requirement for an additional thick color shifting layer. The overall thickness is less than 20 microns, typically around 10 microns.

Figure 4:
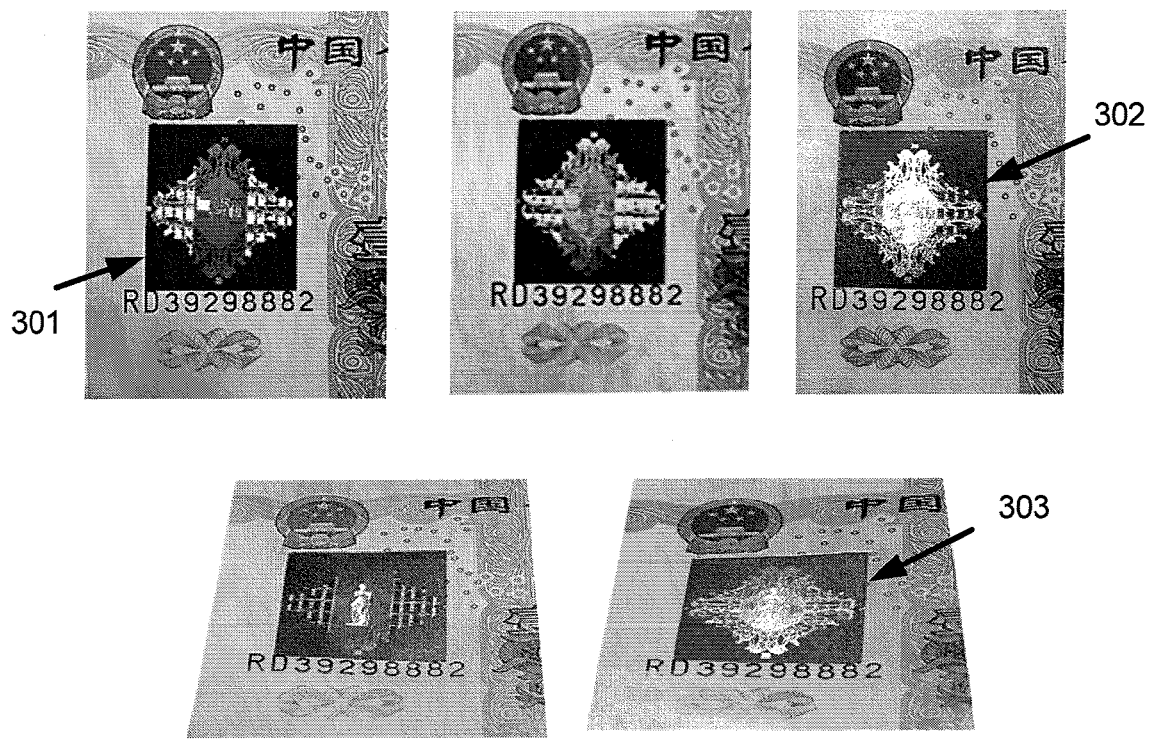
FIG. 4 is a plurality of different views of a same banknote having a hologram bonded to a note substrate having optically variable adhesive as the hot stamp adhesive.

FIG. 4 is a photograph of a portion of a Chinese note, wherein the structure shown in FIG. 2 is hot stamped to the banknote paper. This structure includes a hologram made by Hologram Industries of Paris, France, and provides color shifting effects, i.e. different colors can be seen from different angles. For example, a square background changes its color from indigo, pointed by arrow 301, through violet—arrow 302, to hot pink color, pointed by arrow 303.

The hot-stamped (HS) product has higher chroma than its ink counterpart because the flakes settle fast in the low viscosity formulation adhesive against a smooth substrate. Printed OVP has a lower chroma because one is looking at the side of the ink that was pulled away from the applicator. When a string of ink breaks, clumps of ink flow out a relatively rough surface compared to interface between a plastic substrate and ink. This is why the HS has better chroma than a printed surface.

The device shown in FIG. 4 has at least five security elements: 1) a hologram with a double image—the number "25" in the center of the hologram appears at one angle and disappears at other angles, 2) an image of Venus de Milo that is easily remembered. 3) the hologram has a demetallized Al layer in a lace pattern, 4) a color shift, and 5) covert images seen at 100× or higher magnification.

Figure 5:
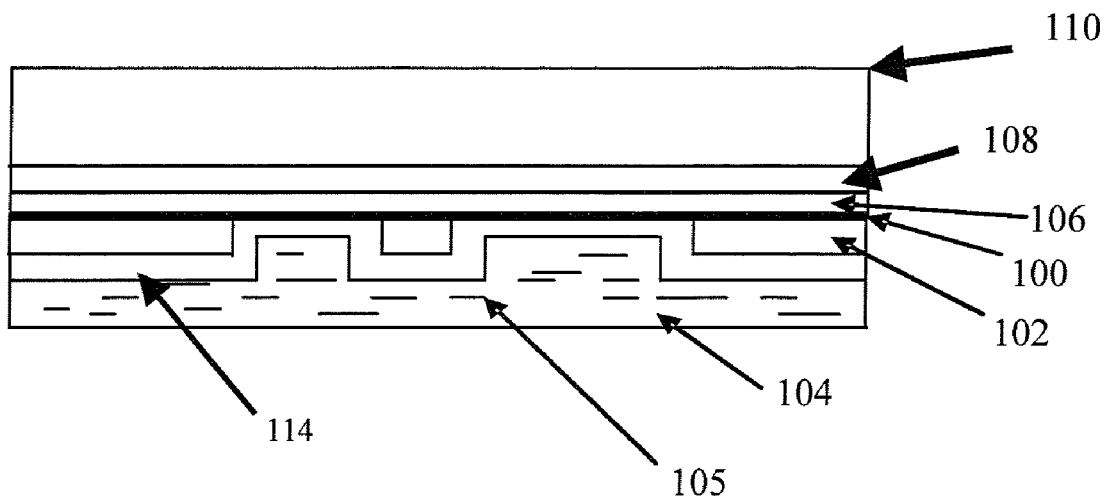
FIG. 5 is a cross-sectional view of a Chromagram with optically variable adhesive and high index layer before hot stamp transfer.

An alternative embodiment of the invention is shown in FIG. 5 wherein a high refractive index layer 114 is coated between the optically variable adhesive layer 104 and the Al patterned layer 102. The high refractive index coating 114 of a material such as ZnS, TiO2 or ZrO2 is coated over the demetallized holographic film. In this instance, the high index layer 114 allows the diffractive or holographic surface 100 to be seen at the same time as the optically variable adhesive 104. The high refractive index prevents an optical index match between the adhesive and the embossing in the resin layer.

Figure 6:
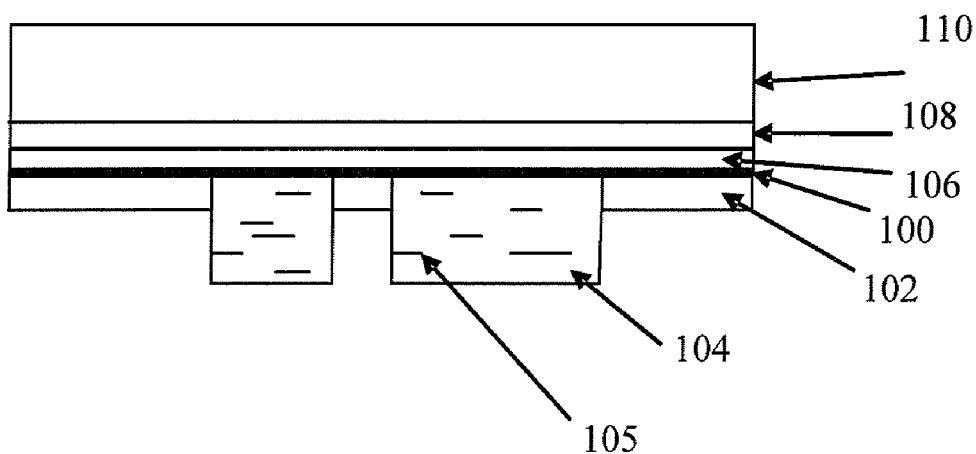
FIG. 6 is a cross-sectional view of a Chromagram with optically variable patterned adhesive.

An alternative embodiment is shown in FIG. 6, wherein the optically variable adhesive 104 is printed between the windows of the aluminum 102 so that the transferred device will be tamper evident. If one tries to remove the device, it will break apart in regions defined by no adhesive and with adhesive.

Figure 7:
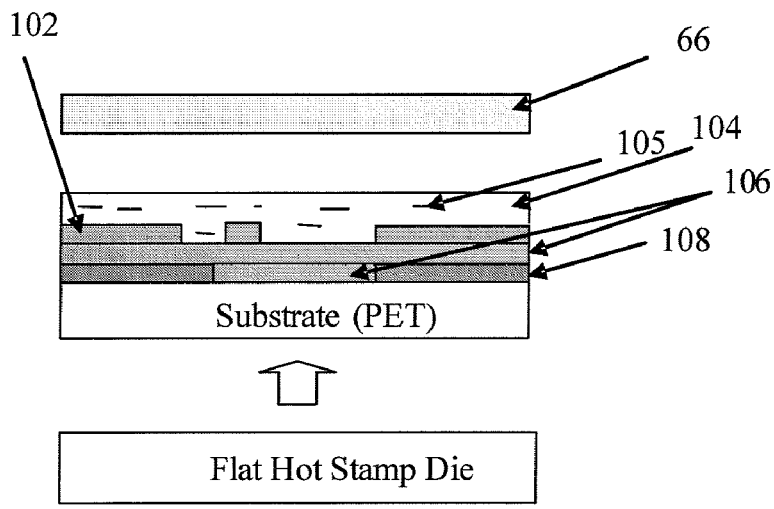
FIG. 7 is a cross-sectional view of a tamper evident device before hot stamping.
Figure 8:
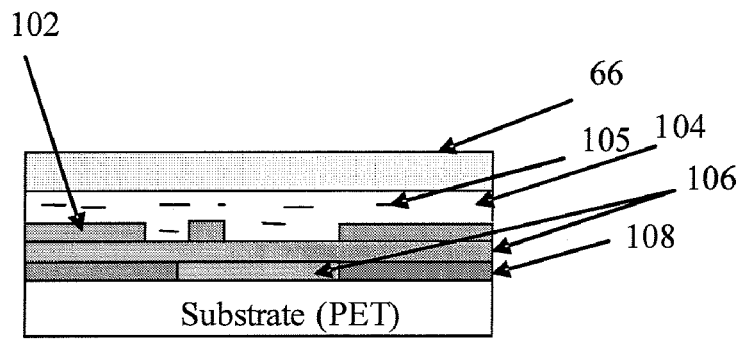
FIG. 8 is a cross-sectional view of the tamper evident device shown in FIG. 7, after hot stamping.
Figure 9:
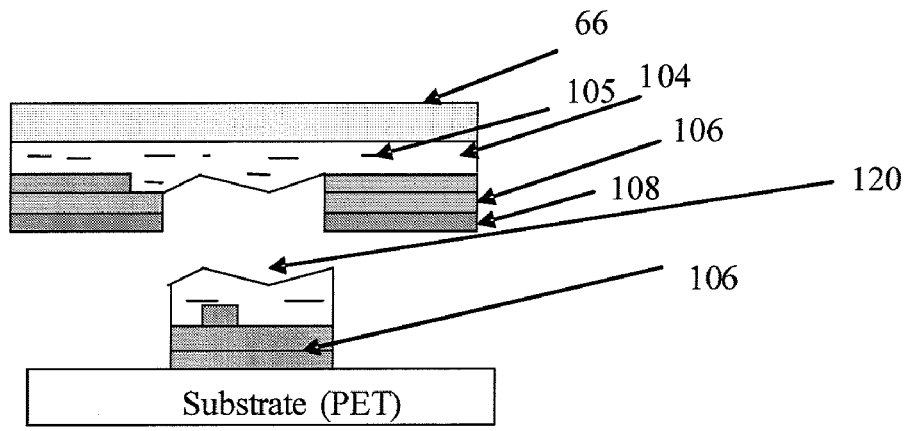
FIG. 9 is a cross-sectional view of the tamper evident device shown in FIG. 7, after attempted removal.

According to another embodiment of the present invention shown in FIGS. 7-9, a device has a patterned release layer 108 on a substrate, resin layer 106 with high adhesion to the substrate, and is coated continuously across the windows and non-windows of demet aluminum layer 102 with an OVP adhesive 104 with flakes 105 therein. FIG. 7 shows the device before hot stamping it to carrier 66 which needs protection. In operation, the device is attached to the surface 66 as shown in FIG. 8, wherein adhesive 104 is activated by hot stamping. If someone tries to detach the device from the carrier, the release layer 108 only releases in a pattern, leaving a reverse pattern on the substrate 66. The result of such attempt is shown in FIG. 9, wherein the broken jagged split of adhesive is pointed by arrow 120. In effect, this device is a tamper evident security label.

The following embodiments of the present invention are Chromagrams having two different layers of optically variable energy activated adhesive for providing at least two different optical effects, wherein one of the adhesives may contain covert taggant flakes, referred in the art as taggants or taggents.

Figure 10A:
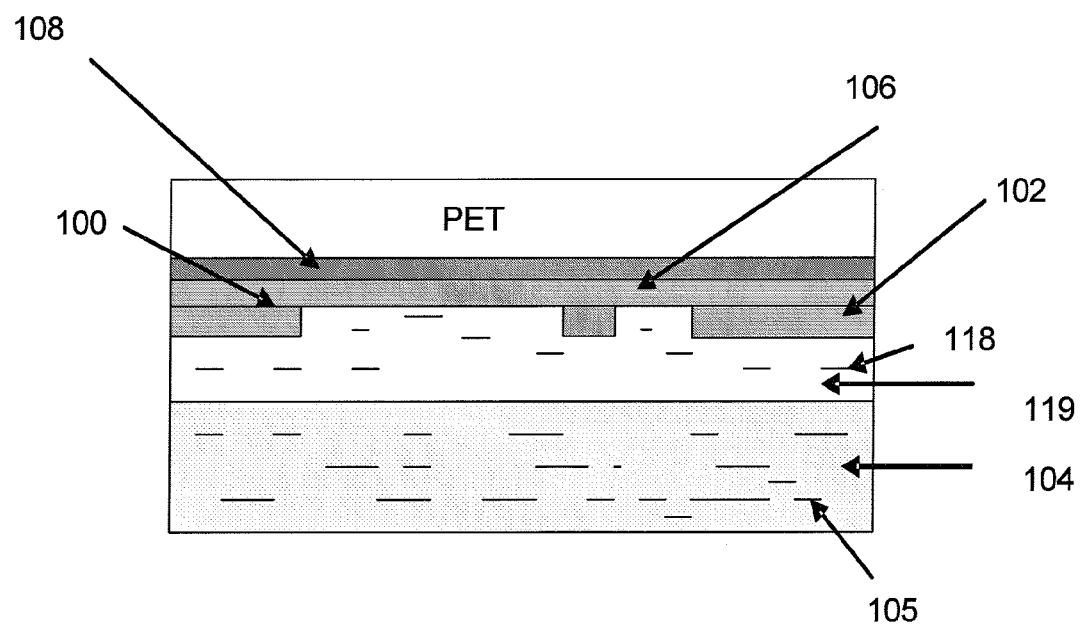
FIG. 10a is a cross-sectional view of a Chromagram structure showing color shift hot stamp adhesive with an overlayer of adhesive containing covert taggants.

In the embodiment shown in FIG. 10a, a Chromagram comprises a hologram, that may be demetalized, or a high index layer, or other relief type surface, and the adhesive made up of two discrete layers. One of the hot stamp adhesive layers, layer 119, contains covert materials, in this instance covert flakes 118, and the other hot stamp adhesive 104 contains optically variable pigment 105. This invention provides a vehicle for efficient use of expensive covert materials. The examples of covert flakes 118 include, but not limited to, charms or taggants as taught in US Patent Application Publication No. 2006/0035080 incorporated herein by reference, shaped pigments, magnetic flakes, fluorescent pigments, standard UV activated to form visible light, or specialized anti-Stokes materials IR activated to form visible light. The covert materials are placed in a thin layer of adhesive 119 covered by a layer of adhesive 104 containing color shift pigments, such as thin film metal-dielectric, all dielectric, mica based pigments, liquid crystal pigments etc. The covert materials are not visible under normal condition, but easily detectable, for example, in UV light, or under a microscope, or by magnetic or infrared detectors. Upon application of the Chromagram to a document or other object requiring protection, the PET layer having a thickness of 12-25 microns, typically 19 microns, is discarded leaving a very thin security device on the document, no more than 20 microns thick.

Figure 11:
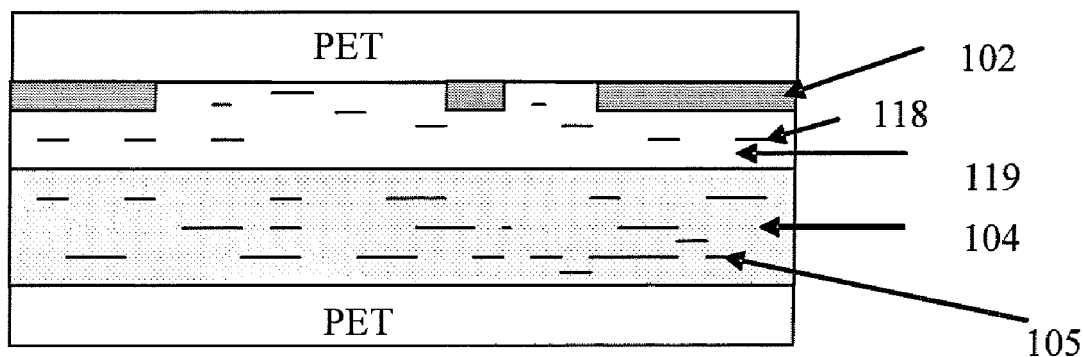
FIG. 11 is a cross-sectional view of a Chromagram structure showing patterned aluminum with a color shift hot stamp adhesive and a separate top layer of adhesive containing covert platelets.

An alternative embodiment of the invention is shown in FIG. 11. A patterned Al layer 102 on a PET substrate is laminated to another PET substrate that has been coated with optically variable adhesive. The aluminum pattern may take the image of text, symbols, bar-codes or even photographic images. The aluminum is patterned by means of a demet process (laser ablation, chemical etch, or oil ablation of a flexographic print image in a vacuum machine). In the case of photographic images produced by using the oil ablation process resolutions down to 70 microns (≈180 dpi) can be achieved. Oil ablation is the demet method of choice since the patterned aluminum takes places in line, in vacuum, in one process step. The optically variable adhesive comprises at least one of two discreet layers of adhesive, one adhesive layer 104 contains color shift pigments 105 and another adhesive layer 119 contains covert materials 118. This forms a security thread. In this case, the thickness of the PET layers is about 5-10 microns each, so that the overall thickness is 20 microns or less. This thickness limitation is necessary for a security thread so that in a stack of banknotes one end of the stack is not thicker than the other end.

Figure 10B:
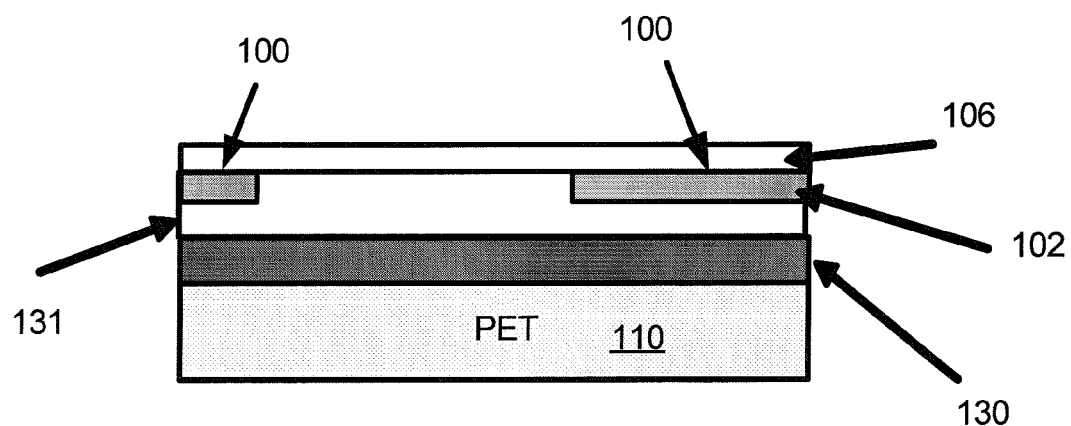
FIG. 10b Security thread constructed from OVA and roll-on transfer of demet hologram using two different OVA layers.

In another embodiment of the present invention shown in FIG. 10b, a two coat process is utilized to laminate two transparent substrates together. First, a demet hologram is coated by successive layers of optically variable adhesive: a first coat of an optically variable adhesive 130, either magnetic or non-magnetic, and a second coat of a different optically variable adhesive 131. By way of example, the first coating shifts color gold-to-green, and the second coating shifts blue-to-red. Then a substrate 110, transparent or semi-transparent, is laminated via a hot nip roller to the adhesive 130. After that, a second substrate supporting the hologram (not shown) is removed leaving protective layer 106. The final product has different color shifting effects dependent on which side it viewed from. In yet other embodiments, one of the coatings is non-shifting, and/or contains covert features.

In reference to FIG. 11, an additional embodiment of this invention is a structure wherein an optically variable adhesive is used to laminate two pieces of transparent PET to produce a color shifting security thread. Looking at one side of such a structure, in FIG. 11 from top down, one would see the image formed by the demet hologram and a color shift in addition to the covert images e.g. fluorescent. From the other side, one would only see a color shift if the opaque pigments were used at high concentration. For example, interference based metal-dielectric pigments at concentrations greater than 10% of pigment weight in total solids—pigment plus adhesive produce such an effect. In this embodiment, a release layer is absent, and the patterned metal layer and the covert images are optional.

In one embodiment of the present invention, an adhesive with color shifting flakes therein is used as a laminate adhesive to make a security thread that is thin and has qualities of an optically variable device (OVD). By way of example, a 6-10 micron thick web is coated with the optically variable adhesive (OVA), which is a thermoset adhesive or a moisture cure urethane adhesive with OV particles therein, and laminated at a hot nip to another 6-10 micron thick web to produce a laminate sheet. This sheet is then slit for security ribbons having 2-5 mm in width, which are typical widths used for currency. In essence, it creates a synthetic foil due to the low viscosity of the adhesive during the first coating operation and then again during the nip process. Both processes tend to align the flakes flat with the web surfaces.

In one embodiment of the present invention a transparent substrate, for example made of PET, with dye added to add or suppress colors of the optically variable adhesive, disposed on the substrate, and printed information is added to the substrate layer. Optionally, a demet Chromagram is roll nipped to the adhesive layer.

Figure 12A:
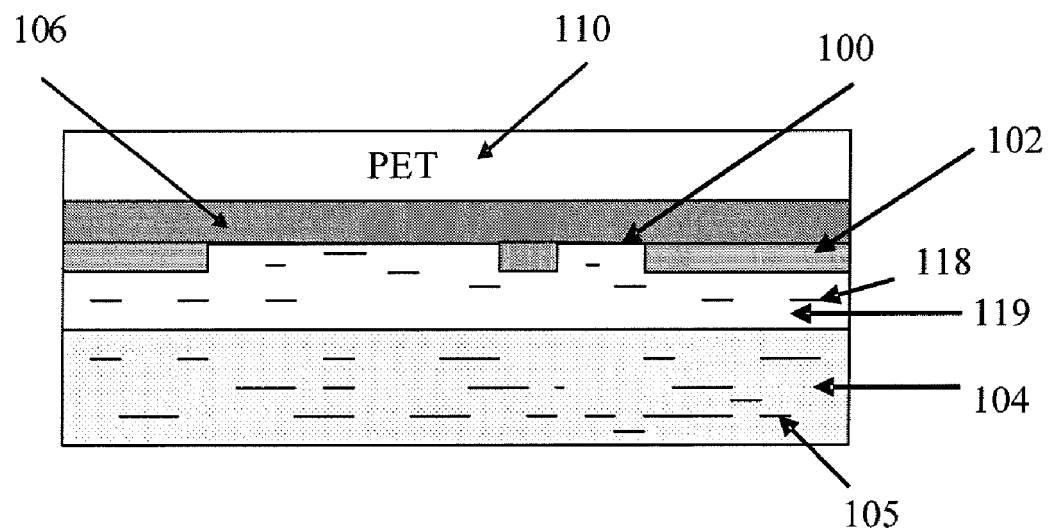
FIG. 12a is a cross-sectional view of a Chromagram structure according to one embodiment of the present invention.

According to another embodiment of the present invention, the structure shown in FIG. 12a has resin layer 106, embossed with relief 100, but has no release layer. Relief 100 is covered with demet aluminum 102 and two layers of adhesive 104 and 119 with different flakes 105 and 118. By way of example, flakes 119 are covert flakes, taggants, and flakes 105 for providing a color-shifting effect. Alternatively, substrate 110 itself can be an embossable layer. Such materials as type G PET, Polycarbonate, polyvinyl chloride or polymethacrylate are suitable for embossable substrate 110. This structure would be useful as a security label, so that layer 104 would be attached to the outside of a box or package.

In one embodiment of the present invention, a demet hologram is first coated with charms in an adhesive, followed by an additional hit of adhesive with OVP therein. This double hit method utilizes fewer charms and makes the charms more visible, than known in the art methods, wherein charms are disposed throughout the optically variable ink medium and many of the charms are screened out by the overlaying OVP opaque particles. Preferably, the OV ink has an acrylic or urethane carrier.

In one embodiment of the present invention, the first adhesive layer is discontinuous. By way of example, a first thin layer of adhesive carrier with relatively low viscosity is printed onto a substrate in form of dots. The carrier contains a high density of charms or other flakes therein, and is covered with a second layer of less expensive adhesive providing an additional optical effect.

Figure 13:
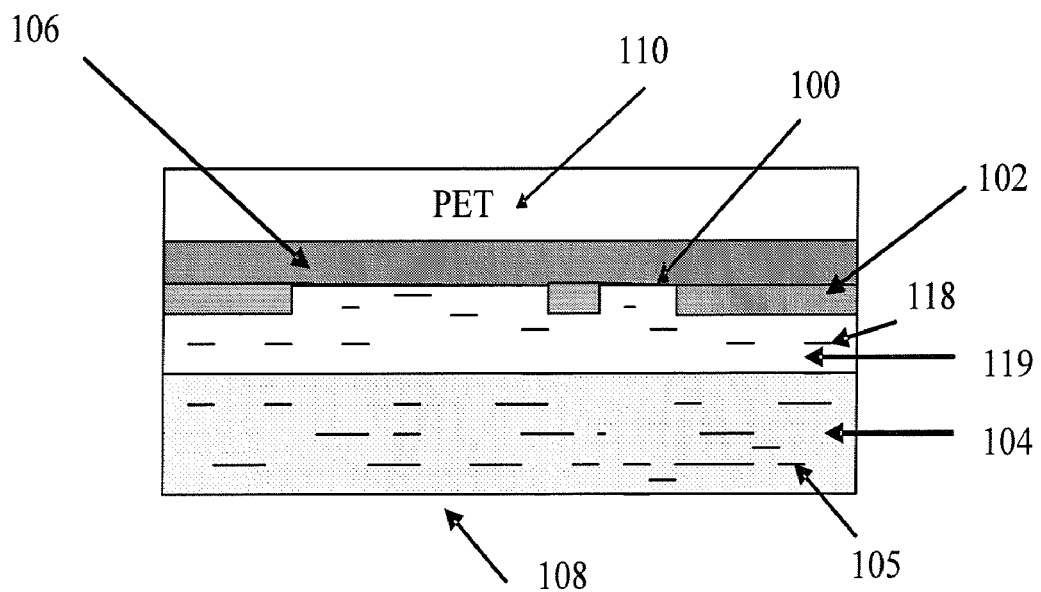
FIG. 13 is a cross-sectional view of a thin color shifting security thread.

In another embodiment shown in FIG. 13, the structure is composed of a PET layer 110, an optional resin layer 106 with embossing, a demet Al layer 102, two layers of adhesive 104 and 119, and a protective hardcoat covering layer 108, i.e. the protective hardcoat/release takes the place of the second PET. In this way, the overall security thread type structure can be made quite thin, for example, 15 microns even if a 9 micron PET is used for embossing or for depositing an embossing lacquer/resin 106. By way of example, this structure is made by running a PET with a demet hologram or a PET just with patterned Al, through a heated nip against a releasable PET coated with the layers of adhesive containing the color shift materials and the covert materials. The releasable PET is later discarded, but hardcoat layer 108 stays with the final structure as shown. Alternatively, a demet hologram on a PET substrate is processed serially through a number of gravure print stations including two print stations for the adhesive 119 and 104 and a print station for the protective hardcoat. Drying stations are placed between each print station.

In the embodiments described hereinafter, an OV foil has a demet hologram in a region thereof with an OV adhesive between the foil and demet hologram.

Figure 12B:
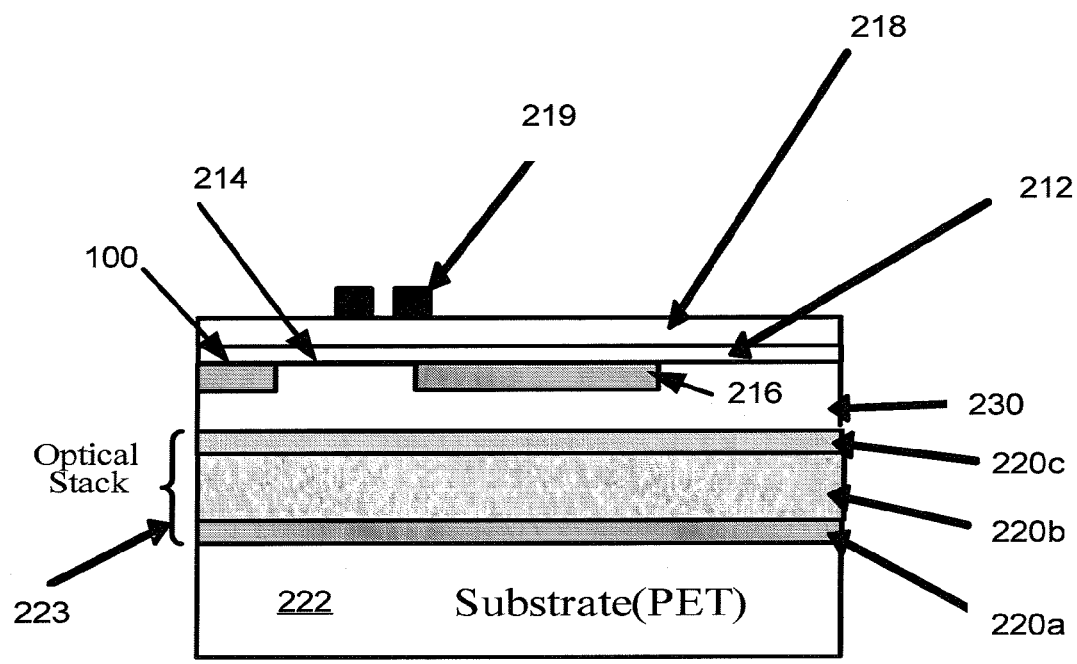
FIG. 12b is a cross-sectional view of a Chromagram with an adhesive between an optically variable (OV) foil and demet hologram.

In another embodiment shown in FIG. 12b, first substrate 222 is coated with a reflective layer 220a, a dielectric layer 220b and an absorber layer 220c forming an optically variable color shifting foil 223. Substrate 212, which can be a resin/hardcoat layer, is impressed with a hologram and partially coated with a pattern of highly reflective aluminum 216 in register with the hologram, for preventing light from passing therethrough. As a result, substrate 212 has one or more regions 100 embossed and covered with demet aluminum. Substrate 212 optionally has one or more regions 214 embossed but not covered with aluminum. Resin layer 212 is optionally covered with protective light transmissive layer 218 with opaque indicia 219 printed thereon. The demet hologram is hot stamped or hot roll nipped to the optical stack using clear hot stamp adhesive 230.

Figure 12C:
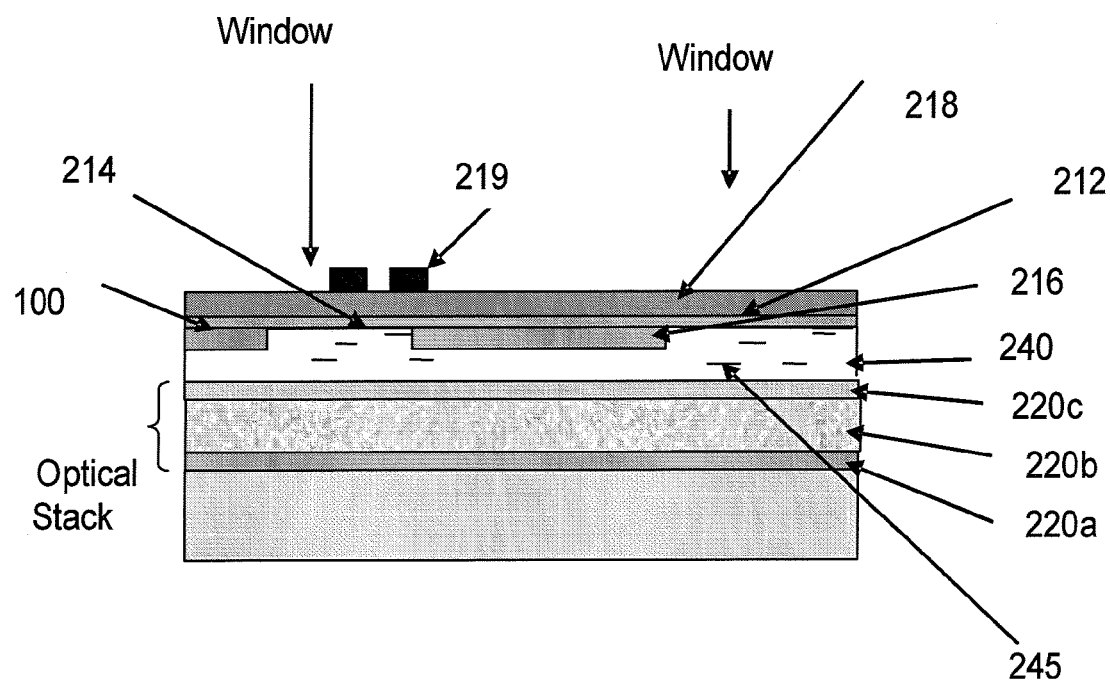
FIG. 12c is a cross-sectional view of a Chromagram with a clear adhesive between the foil and demet hologram, wherein the adhesive contains covert flakes or a low concentration of optically variable flakes or optically variable magnetic flakes.
Figure 12D:
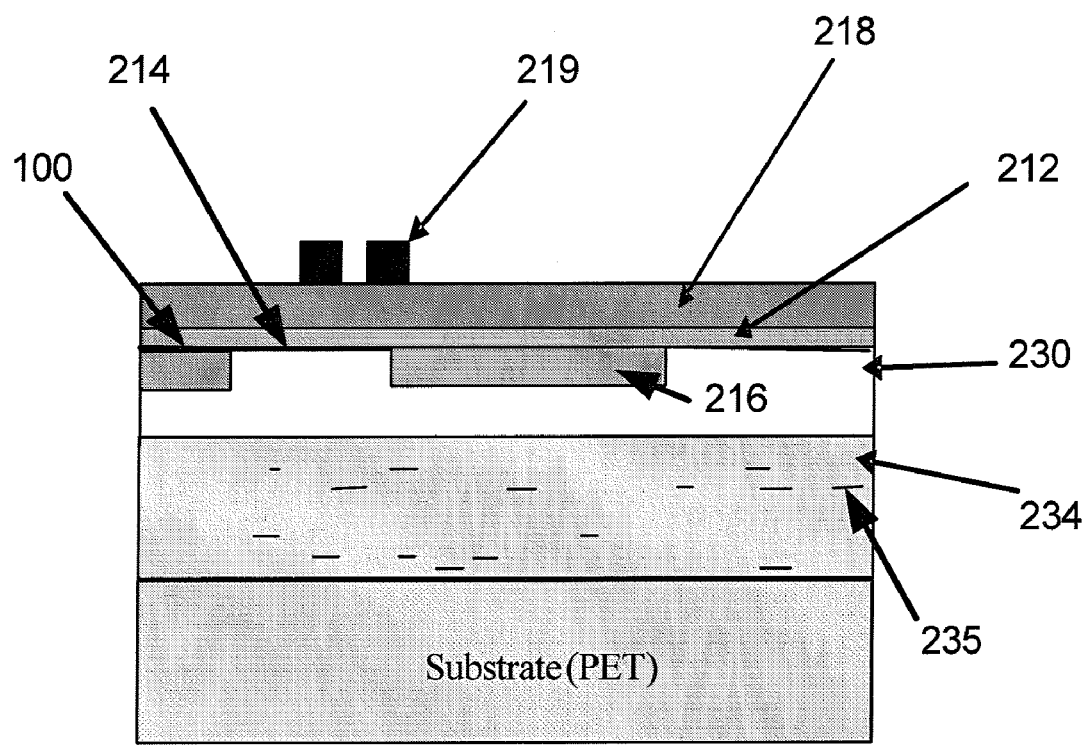
FIG. 12d is a cross-sectional view of a Chromagram with an adhesive.

Shown in FIG. 12d, a layer of adhesive with OV particles can be used as shown in another embodiment shown in FIG. 2d. This embodiment is similar to shown in FIG. 12b in many respects, however has a first substrate, preferably made of PET, coated with a color shifting flakes 235 in a carrier 234, an adhesive or acrylic- or urethane-based ink, hot stamped to the same upper structure as in FIG. 12b. After the ink has dried and cured, thus forming a color shifting coating, a hot stamp adhesive 230 is applied and cured. To form a Chromagram the coated first substrate having the hot stamp adhesive 230 is bonded with a second substrate covered with the same layers as in the embodiment shown in FIG. 12b.

In another embodiment shown in FIG. 12c, covert flakes 245 bearing indicia that cannot be seen with the unaided eye are mixed into the hot stamp adhesive 240 and are used to bond the two structures together as in the previous embodiments. In this embodiment both color shifting effects that can be seen though the windows where the Al coating is missing and with magnification the covert flakes 245 can be seen and serve as a means of authentication. Instead of covert flakes, optically variable flakes could be used at low concentrations so that the OV foil colors are modified when viewing from the top.

This manufacturing process allows the first and second substrates to be manufactured in two different facilities and stored in rolls to be united later.

The present invention was reduced to practice as follows: The adhesive was diluted to the correct strength by the addition of toluene and applied using a reverse gravure coater equipped with in-line drying ovens. The applied adhesive levels ranged from 1.5-10 g/sq m while the pigment applied was between 0.005 and 0.05 g/sq m for the covert pigment and 1-10 g/sq m for color shift OVP pigment. Two optically variable pigments were chosen for a series of devices: a red to green two period stack i.e. Ab/D/Ab/D/R/D/Ab/D/Ab and a Blue to Red a one period optical stack i.e. Ab/D/R/D/Ab, where Ab is an absorber of Cr, D is a dielectric of $MgF_2$, and R is a reflector of aluminum. Two different covert charms were used: a 10 micron square shaped pigment with a ∈ symbol located in its center and a 30 micron square shaped pigment with a $ sign in its center. The press speed was about 20 feet/min for each.

Experimental Results

Experiments were preformed by incorporating optically variable pigment (OVP) into a commercially available hot stamp adhesive. The thickness for hot stamp adhesive was between 3 μm and 10 μm, with preferable range 3-7 μm.

Formulas were developed to estimate pigment deposition weight of applied pigment to hot-stamp adhesive (HSA) coating from their optical density. It was found that in general the optical density of a pigment/HSA should be approximately 0.3 or greater on a black background to obtain optical performance that approaches coatings with an optical density of approximately 0.6 on a white background.

In test trials, a series of hot-melt adhesive and pigmented hot melt adhesive blends were coated on 19 μm polyester film with a release layer and Chromagram layer.

The adhesive coating was carried out on a 10" wide solvent roll coater with 100 feet of drying oven. The adhesive was applied by reverse roll gravure.

Pigments were blended into a commercial hot-melt adhesive and stirred continuously until placed in the coating pan. Toluene was used to dilute formulations to obtain the lower coating weight samples. The sample for percent solids was taken from the adhesive just before it was added to the coating pan. The adhesive application weight was obtained by weighing a known area of coated web, removing the adhesive with solvent, drying the web, and weighing the web after the adhesive was removed. Three samples across the web were taken for each coating weight and averaged to obtain a coating weight for each sample. Anilox rolls were cleaned after each sample was run. A 75 TH (Trihelical) Anilox roll was used for the majority of the experiments. A 55 TH Anilox roll was used with two coatings to increase the amount of deposited adhesive.

The first 4 coatings were un-pigmented applications coated at two different dilutions. These coatings were used to determine the optimum coating weight for acceptable hot stamp transfer. It is known in the art that the adhesive thickness can vary in a very broad range. By way of example, conditions that yielded an un-pigmented adhesive thickness of 3 μm-3.5 μm, calculated from g/m measurements, were chosen to yield the optimum adhesive coating thickness.

Each of the coated web samples was evaluated for stamping performance and optical density. Hot stamp transfers were made of all the samples. The optimum stamping conditions for transfer were found to be 100° C. to 125° C., 0.5-1.0 second dwell time, using the Kenson Hot Stamp Press with the 35 mm×22 mm rectangular brass stamp. The pressure was adjusted to its lowest operational point to minimize embossing of the evaluation samples. Very little fringing was observed with any of the samples. Hot stamp transfers of each of the samples were made onto the black and white areas of Leneta cards. The transfers were made at 100° C., 1.0 sec. dwell time. Reflectance scans and color variation measurements were made over the black and white backgrounds for each transfer.

Optical densities were measured over the transparent areas of the web.

Tables 1 and 2 summarize the adhesive coated web properties.

TABLE 1

| ROLL# | PIGMENT COLOR | LINE CYLINDER | BCM | ADHESIVE SOLIDS | grams solids per sq meter deposited | TOTAL % SOLIDS | CALC % PIGMENT IN SOLIDS | CALC g per sq meter deposited pigment only | CALC g per sq in deposited pigment only |
|---|---|---|---|---|---|---|---|---|---|
| 1 | NONE | 75TH | 35.5 | 24.00% | 4.83 | 24.00% | 0.00% | 0.00 | |
| 2 | NONE | 75TH | 35.5 | 24.00% | 5.14 | 24.00% | 0.00% | 0.00 | |
| 3 | NONE | 75TH | 35.5 | 12.00% | 3.13 | 12.00% | 0.00% | 0.00 | |
| 4 | NONE | 75TH | 35.5 | 12.00% | 2.16 | 12.00% | 0.00% | 0.00 | |
| 5 | HIGH RED | 75TH | 35.5 | 12.00% | 2.42 | 15.00% | 17.24% | 0.42 | 0.0002692 |
| 6 | HIGH RED | 75TH | 35.5 | 12.00% | 3.58 | 17.00% | 29.41% | 1.05 | 0.0006793 |
| 7 | HIGH RED | 75TH | 35.5 | 12.00% | 4.18 | 20.00% | 45.45% | 1.90 | 0.0012258 |
| 8 | HIGH RED | 75TH | 35.5 | 12.00% | 3.95 | 20.00% | 45.45% | 1.80 | 0.0011584 |
| 9 | HIGH RED | 75TH | 35.5 | 24.00% | 6.55 | 37.00% | 34.60% | 2.27 | 0.0014623 |
| 10 | HIGH RED | 75TH | 35.5 | 24.00% | 7.18 | 37.00% | 34.60% | 2.48 | 0.0016030 |
| 11 | BLUE/BRONZE | 75TH | 35.5 | 12.00% | 4.46 | 24.50% | 60.00% | 2.68 | 0.0017264 |
| 12 | BLUE/BRONZE | 75TH | 35.5 | 24.00% | 8.3 | 37.00% | 42.86% | 3.56 | 0.0022949 |
| 13 | JADE/VIOLET | 75TH | 35.5 | 24.00% | 7.88 | 35.50% | 36.84% | 2.90 | 0.0018730 |
| 14 | ROSE/GREEN | 75TH | 35.5 | 24.00% | 8.6 | 41.00% | 42.86% | 3.69 | 0.0023779 |
| 15 | ROSE/GREEN | 55TH | 49.5 | 24.00% | 15.69 | 38.00% | 36.84% | 5.78 | 0.0037294 |
| 16 | ROSE/GREEN | 55TH | 49.5 | 24.00% | 15.61 | 38.00% | 36.84% | 5.75 | 0.0037103 |

ADHESIVE IN PAN NOT STIRRED DURING RUN, LARGE AMOUNT OF SETTLING OBSERVED

ADHESIVE IN PAN NOT STIRRED DURING RUN, NO SETTLING OBSERVED

TABLE 2

| ROLL# | PIGMENT COLOR | CALC g per sq meter deposited no pigment | grams pigments per 100 g adhesive solution | OD | Caculated Adhesive Thickness in Microns | g per sq M deposited pigment only for CALC OD | CALC OD FROM GRAPH |
|---|---|---|---|---|---|---|---|
| 1 | NONE | 4.83 | 0 | 0.05 | 3.22 | | 0.05 |
| 2 | NONE | 5.14 | 0 | 0.052 | 3.42666667 | | |
| 3 | NONE | 3.13 | 0 | 0.05 | 2.08666667 | | |
| 4 | NONE | 2.16 | 0 | | 1.44 | | |
| 5 | HIGH RED | 2.00 | 2.5 | 0.112 | | 0.5 | 0.1177732 |
| 6 | HIGH RED | 2.53 | 5 | 0.172 | | 1 | 0.1855464 |
| 7 | HIGH RED | 2.28 | 10 | 0.298 | | 1.5 | 0.2533196 |
| 8 | HIGH RED | 2.15 | 10 | 0.288 | | 2 | 0.3210928 |
| 9 | HIGH RED | 4.28 | 12.7 | 0.368 | | 2.5 | 0.388866 |
| 10 | HIGH RED | 4.70 | 12.7 | 0.396 | | 3 | 0.4566392 |
| 11 | BLUE/BRONZE | 1.78 | 18 | 0.408 | | 3.5 | 0.5244124 |
| 12 | BLUE/BRONZE | 4.74 | 18 | 0.566 | | 4 | 0.5921856 |
| 13 | JADE/VIOLET | 4.98 | 14 | 0.51 | | 4.5 | 0.6599588 |
| 14 | ROSE/GREEN | 4.91 | 18 | 0.622 | | 5 | 0.727732 |
| 15 | ROSE/GREEN | 9.91 | 14 | 0.79 | | 5.5 | 0.7955052 |
| 16 | ROSE/GREEN | 9.86 | 14 | 0.82 | | 6 | 0.8632784 |

ADHESIVE IN PAN NOT STIRRED DURING RUN, LARGE AMOUNT OF SETTLING OBSERVED

ADHESIVE IN PAN NOT STIRRED DURING RUN, NO SETTLING OBSERVED

Figure 14:
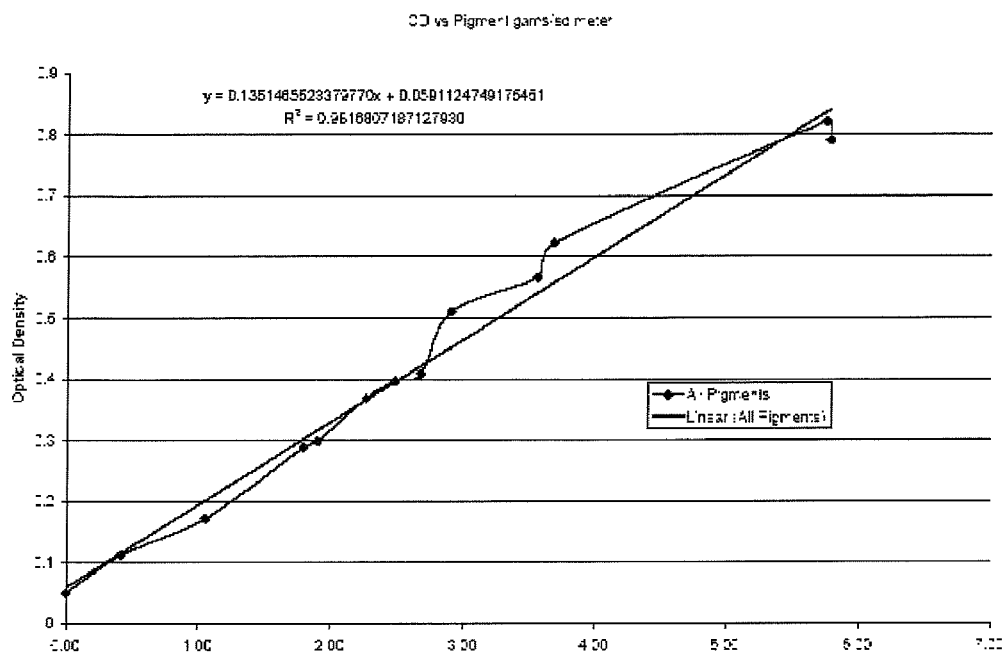
FIGS. 14 and 15 are graphs used to calculate formulas for estimation of the amount of deposited pigment.
Figure 15:
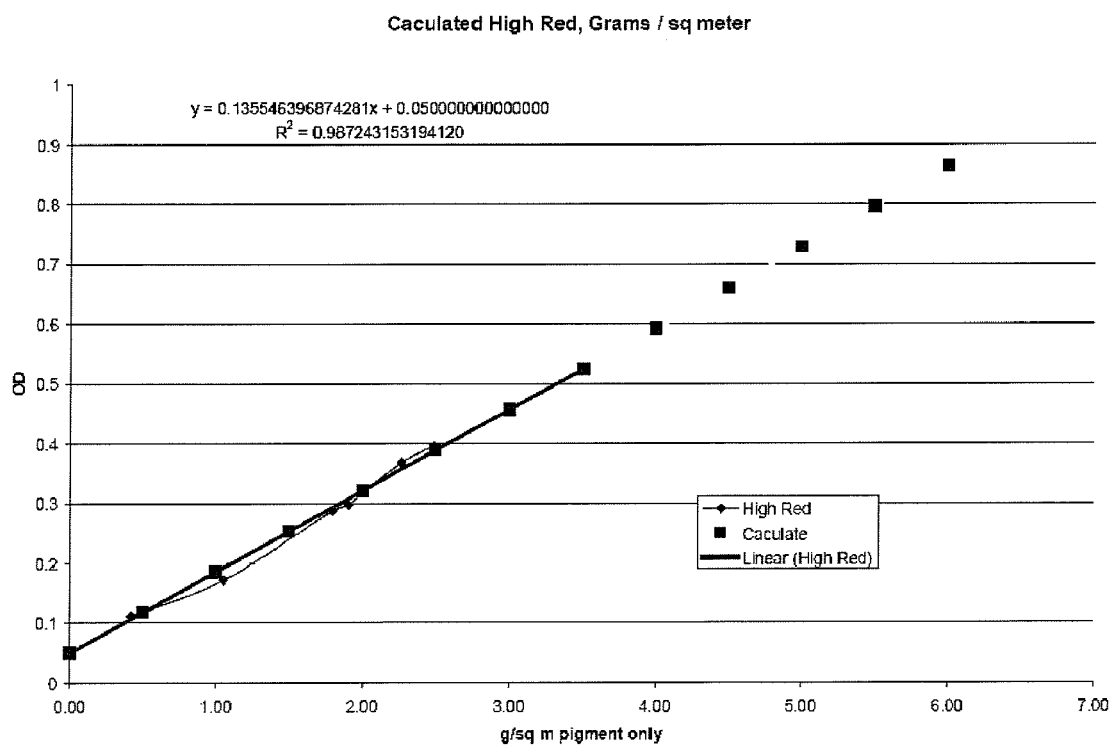

The optical density (OD) of the pigment-containing adhesive was used to estimate the amount of pigment on the web. This was done to determine if this could be used as a viable analytical procedure for setting a production specification for the adhesive/pigment deposition. If the ratio of pigment to adhesive is known for any formulation, the optical density of the adhesive coating could be used to determine the amount of adhesive applied to any transparent web. The optical density of the High Red vs. weight per unit area of High Red was plotted in FIG. 15; this dependence was used to obtain the formula for High Red. All of the optical densities vs. grams of pigment per m² were plotted in a separate graph shown in FIG. 14, and a second formula was obtained from this data set. The formulas are very similar regardless of the differences in pigment weight per unit area. It is likely that an offset exists in the total data set due to pigment settling and the fact that 3 of the 4 pigments tested have similar pigment weight per unit area. These factors may cause the formulas to yield slightly higher pigment weights per unit area.

The resulting formulas for estimation of the amount of deposited pigment are:

Grams of deposited pigment=$0.1351465523379770 \times (OD$ coated film$)+0.0591124749175451$ Grams of High Red deposited per sq meter=$0.135546396874281 \times (OD$ coated film$)+0.05$.

Table 3 compares the measured optical density of the coating with the optical density value calculated using the above formula. Because of relatively low variations between OD measured and OD calculated shown in Table 3, the optical density of the adhesive coating can be used to determine the amount of adhesive applied to any transparent web for a known ratio of pigment to adhesive.

TABLE 3

| PIGMENT | CALC g/sq M deposited pigment only | CALC OD FROM GRAPH | Measured OD | +/- Percent variation in OD measured vs. OD calculated |
|---|---|---|---|---|
| NONE | 0 | 0.05 | 0.05 | 0 |
| HIGH RED | 0.417241 | 0.106556 | 0.112 | 4.98% |
| HIGH RED | 1.052941 | 0.192722 | 0.172 | 11.36% |
| HIGH RED | 1.9 | 0.307538 | 0.288 | 6.56% |
| HIGH RED | 1.795455 | 0.293367 | 0.298 | 1.57% |
| HIGH RED | 2.266621 | 0.357232 | 0.368 | 2.97% |
| HIGH RED | 2.484632 | 0.386783 | 0.396 | 2.35% |
| BLUE/BRONZE | 2.676 | 0.412722 | 0.408 | 1.15% |
| JADE/VIOLET | 3.557143 | 0.532158 | 0.51 | 4.25% |
| BLUE/BRONZE | 2.903158 | 0.443513 | 0.566 | 24.27% |
| ROSE/GREEN | 3.685714 | 0.549585 | 0.622 | 12.36% |
| ROSE/GREEN | 5.780526 | 0.83353 | 0.82 | 1.64% |
| ROSE/GREEN | 5.751053 | 0.829534 | 0.79 | 4.88% |

Figure 16:
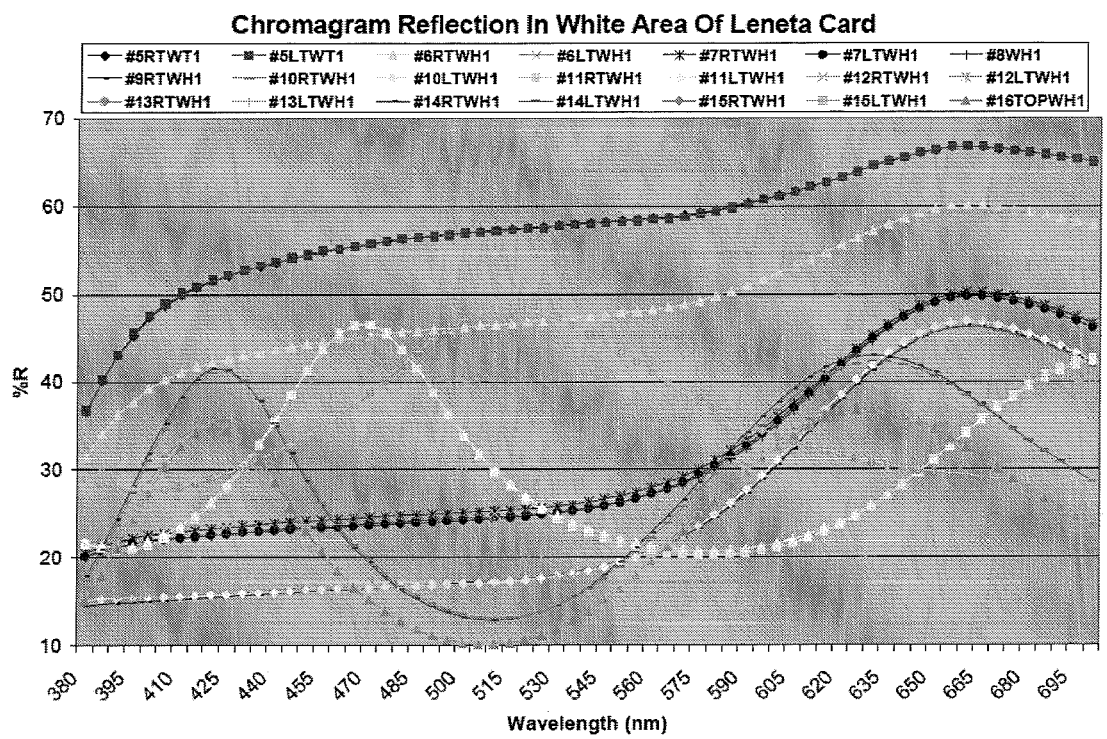
FIGS. 16 and 17 are graphs depicting reflectance scans of hot stamp transferred images.
Figure 17:
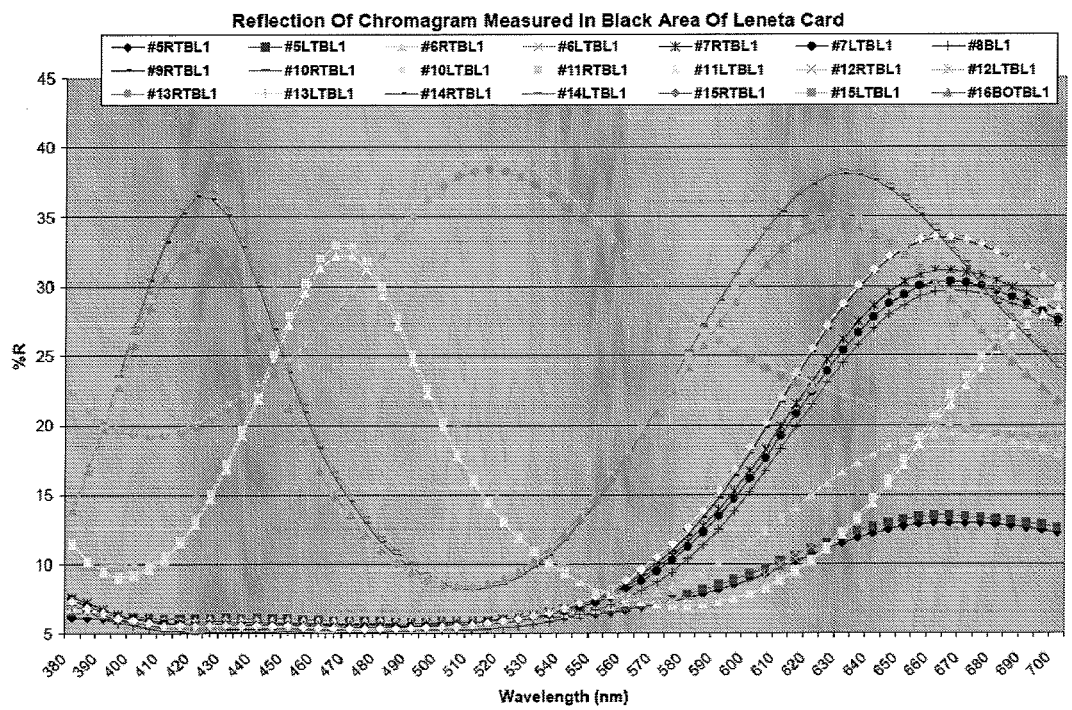
Figure 18:
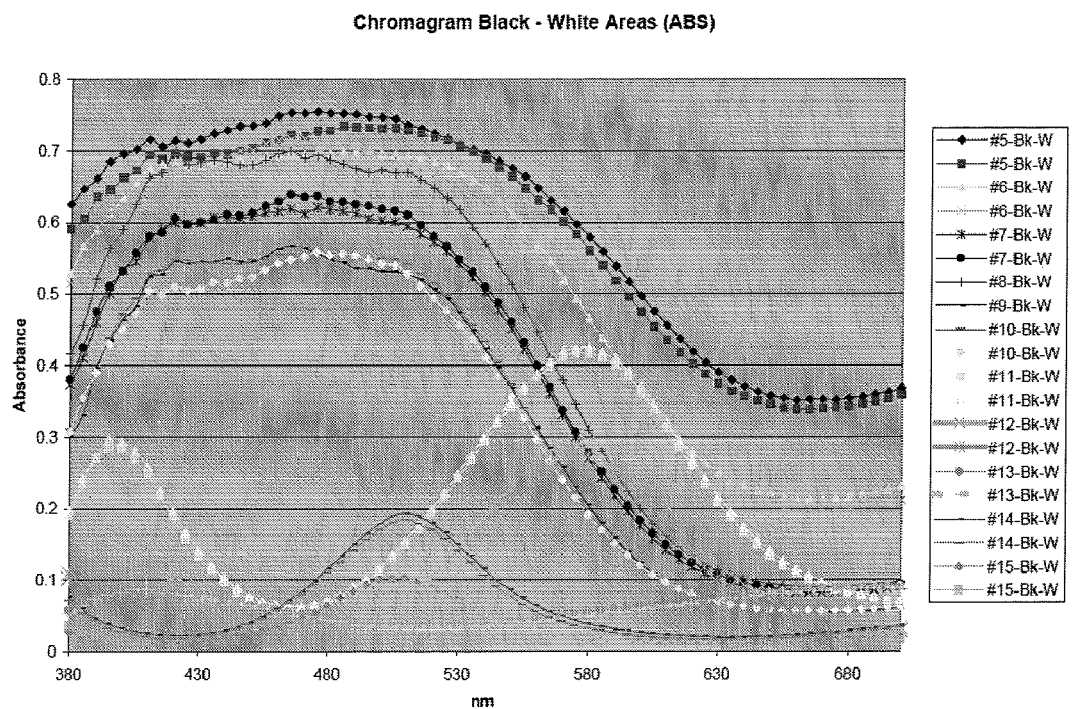
FIG. 18 is graphical representation of the subtractive absorbance data.

FIGS. 16 and 17 are reflectance scans of hot stamp transferred images onto the white and black areas of Leneta cards, respectively. The data shown in FIGS. 16 and 17 was converted to absorbance, and the values of absorbance related to the white areas were subtracted from the corresponding absorbance values related to the black areas. Graphical representation of the subtractive absorbance data is shown in FIG. 18. Samples that show the smallest variation between their black and white absorbance values have the highest performance. The highest performance samples are the samples with the highest pigment loading.

Figure 19:
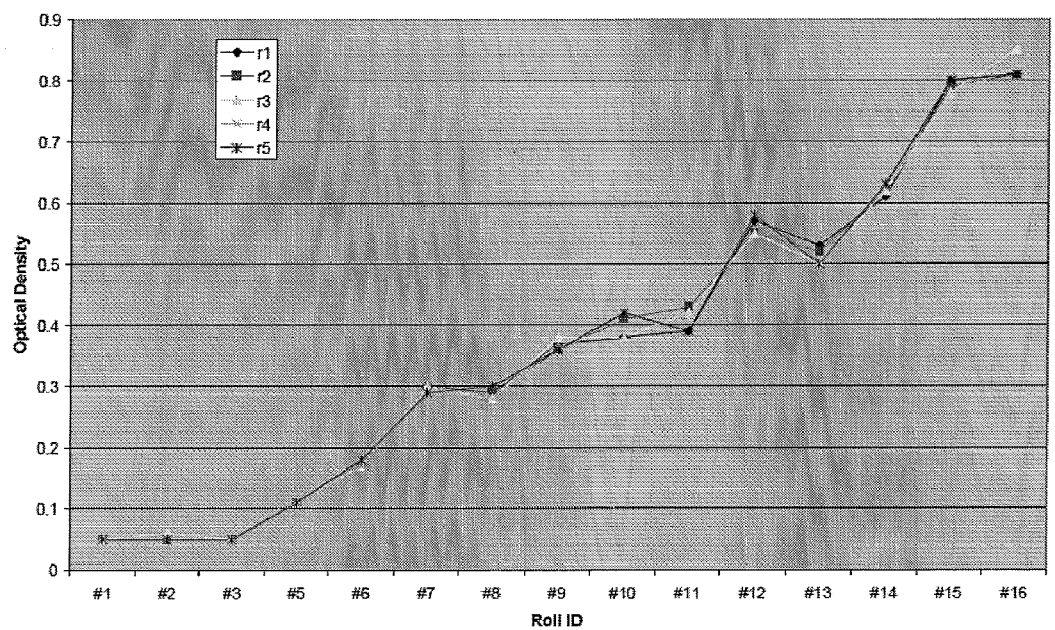
FIG. 19 is a graph of cross web optical density measurements.

Cross web optical density measurements are displayed in FIG. 19. There were 5 equally spaced measurements taken across each web. The data indicated that the cross coating thickness varied by less that +/−5% in all pigmented adhesive cases.

In Table 4 of experimental data, "Charm L" stands for Low concentration of charms and "Charm H"—for High concentration of charms.

TABLE 4

| Roll # | Feet Coated | Roll Description | Adhesive formulation | Appl solids g/sqM | % pigment in liquid ink | % pigment in Total solids | Pigment applied to web g/sqM | Calc % total solids | Total solids Measured | Comments |
|---|---|---|---|---|---|---|---|---|---|---|
| 1 | 150' | Charm L (Opaque Al Venus de Milo layer of US $ charms applied) | 400 gams adhesive + 400 g toluene with .4 gram US $ pigment | 2 | 0.05% | 0.36% | 0.0071174 | 12% | 12%-13% | |

TABLE 4-continued

| | | | | | | | | | | |
|---|---|---|---|---|---|---|---|---|---|---|
| 2 | 450' | Charm H (Opaque Al Venus de Milo layer of US $ and Euro mixed charms applied | 400 gams adhesive + 400 g toluene with 2.6693 total gram Euro + $pigment | 1.5 | 0.33% | 2.33% | 0.0349182 | 12% | | 480.8 grams of Charm L adhesive mix + 159.9 g adhesive + 159.9 grams toluene + .98 US$ + 1.44Euro |
| 3 | 50' | High Red .5OD adhesive on Opaque Al Venus de Milo | 120 g high red in 800 g adhesive | 7.965 | 13.04% | 33.33% | 2.66 | 39.13% | | |
| 4 | 50' | High Red .8OD Adhesive on Opaque Al Venus de Milo | 350 high red in 800 g adhesive | 10.6 | 30.43% | 59.32% | 6.29 | 51.30% | | |
| 5 | 100' | High Red .8OD Adhesive on Opaque Al Venus de Milo on roll #1 Charm H | 350 high red in 800 g adhesive | 10.63 | 30.43% | 59.32% | 6.31 | 51.30% | | |
| 6 | 200' | High Red .8OD Adhesive on Opaque Al Venus de Milo on roll #2 Charm H2 | 350 high red in 800 g adhesive | 13.42 | 30.43% | 59.32% | 7.96 | 51.30% | | |
| 7 | 200' | Blur-Red .8OD adhesive on Opaque Al Venus de Milo | 234 g BR in 800 g adhesive | 8.2 | 22.63% | 49.37% | 4.05 | 45.84% | | |
| 8 | 230' | Blue-Red .8OD Adhesive on Opaque Al Venus de Milo on roll #2 Charm H2 | 234 g BR in 800 g adhesive | 7.53 | 22.63% | 49.37% | 3.72 | 45.84% | | |
| 9 | 200' | Blue-Red .4OD adhesive on Low density Al Venus de Milo | 70 g BR in 800 g adhesive | 6.51 | 8.05% | 22.58% | 1.47 | 35.63% | | |
| 10 | 120' | Blue-Red .5OD adhesive on Low density Al Venus de Milo | 100 g BR in 800 g Adhesive | 6.97 | 11.11% | 29.41% | 2.05 | 37.78% | | |
| 11 | 80' | High Red .3OD adhesive on Low density Al Venus de Milo | See below | 5.6 | 10.51% | 29.03% | 1.6257332 | 36.19% | 37% | Adhesive dilution, 166 g adhesive into 687 g (120 g HR in 800 g adhesive) = 89.61 g HR in 853 g |

| Start ink wt | Total solids | Total pigment | Total adhesive solids | added adhesive solids | HR.3OD Formula | Total solids | Total pigment | Total adhesive solids | % solids pigment |
|---|---|---|---|---|---|---|---|---|---|
| 687 | 268.826087 | 89.60869565 | 179.2174 | 39.84 | | 308.66609 | 89.6086957 | 219.057391 | 29.03% |

Figure 20:
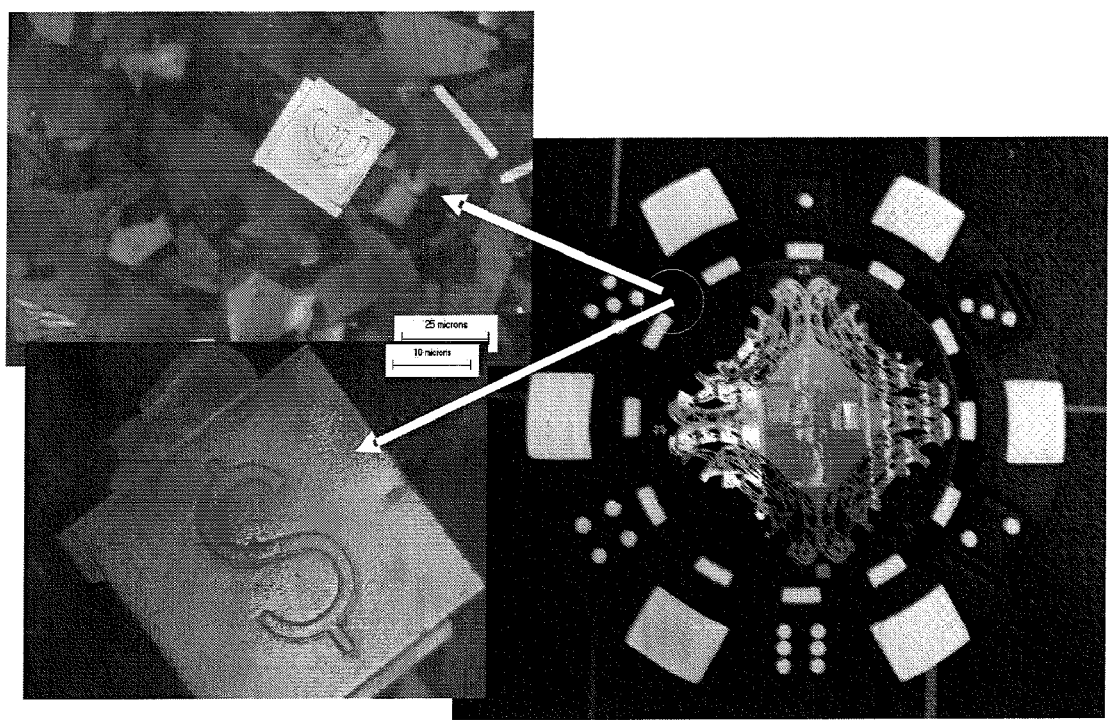
FIG. 20 is a photograph of a security device applied to a casino chip through a hot stamp transfer adhesive process.

FIG. 20 is a photograph of a security device applied through a hot stamp transfer adhesive process as described before, in which covert flakes bearing the ∈ symbol and $ symbol are disposed within the adhesive material over blue to red color shifting flakes in a second layer of adhesive. Here a poker chip has a holographic image of Venus de Milo on a background of color shifting flakes. The covert flakes can be seen with 100 times magnification but are not visible without magnification. This embodiment combines color shifting, holographic effects and covert symbols using adhesive bearing special effect flakes.

To produce the aforedescribed chips, the adhesive coated rolls were slit down the length to a width of 3.25 inches so that two rolls of hologram/OVP adhesive i.e. Chromagrams could be hot stamped two at a time. A Malahide hot stamping machine, model, E4-PK, was used to transfer the Chromagrams to poker chips made of acrylonitrile butadiene stryrene (ABS) copolymer. The die was made of silicone rubber and was set at about 375° F.

Approximately 1000 impressions were continuously printed at the production rate of 450-500 impressions per hour. The transfers had good adhesion when scraped with a fingernail and there was very little fringing. The Chromagram foil production performance was equivalent to commercial hot stamp foils. In practice, the covert images would either show the denomination of the banknote, poker chip or the logo, symbol of the bearer or company issuing such value based documents.

In the case of using transparent covert pigment and transparent color shift pigment in a transparent adhesive, an additional security element is introduced so that the observer will also be able to see printed information that is on the document through the device.

Described hereinafter are embodiments of refined "synthetic threads" wherein multiple optical effects are produced by a layered security system.

Figure 21:
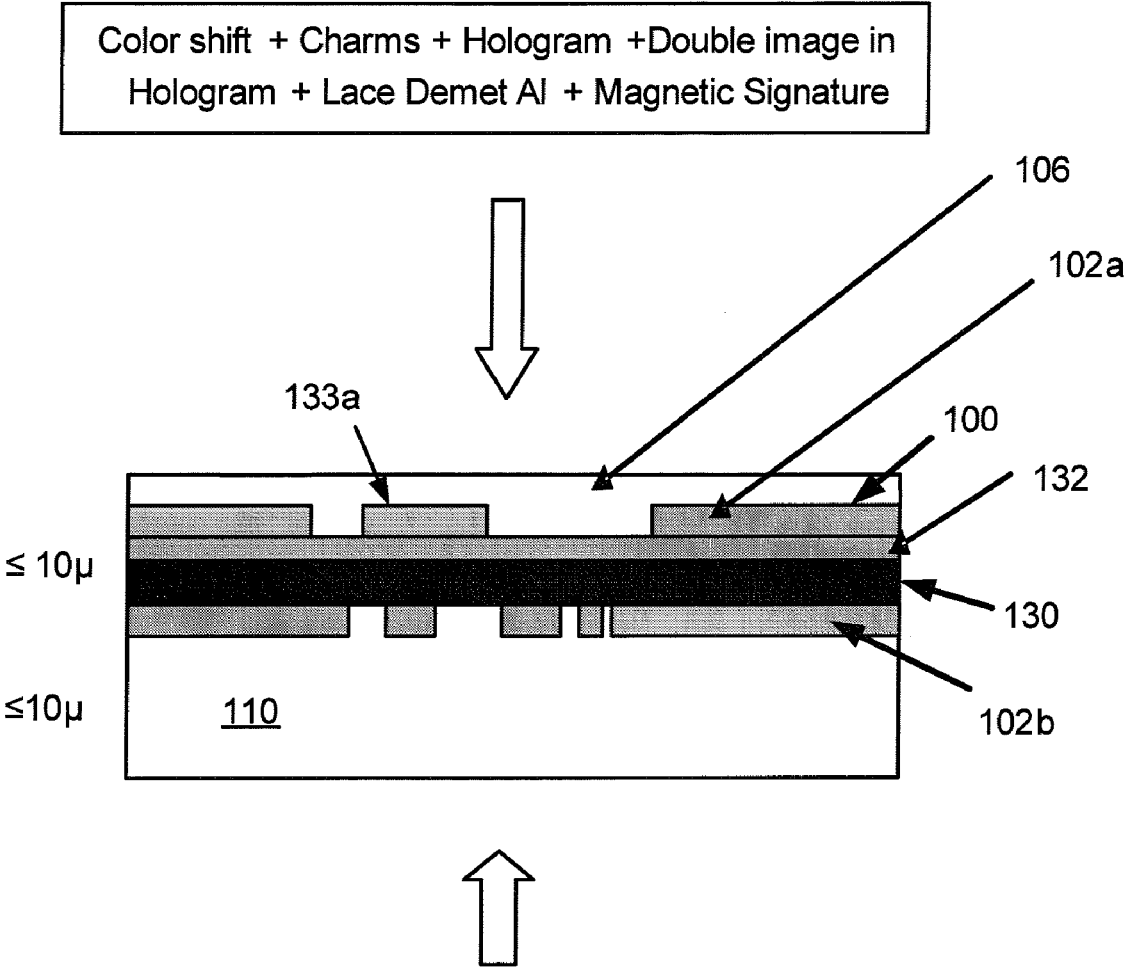
FIG. 21 is a cross-sectional view of a refined "synthetic thread" wherein multiple optical effects are produced by a layered security system.

In reference to FIG. 21, a security thread comprises substrate 110, reflective layer 102*b*, optically variable adhesive layer 130, another layer of adhesive 132 with charms therein, relief structure 100 covered with demet Al layer 102*a*, and resin layer 106. Substrate 110 is preferably made of PET, however oriented polypropylene (OPP) or other plastic materials can be used. The substrate can also be dyed in a continuous color or could be patterned.

Reflective layer 102*b* is preferably made of Al, has windows so that optical effect provided by layer 130 is visible though substrate 110 and reflective layer 102*b*. Optionally, the windows in layer 102*b* are shaped as letters or other insignia, so that a color shifting text can be seen though substrate 110.

Alternatively, instead of the patterned layer 102*b* being internal to the structure, the substrate 110 could have the patterned layer of Al facing outward while the internal interface of the PET is in contact with the layer 130. In the case where the reflective patterned Al faces the outside of the device, an additional protective layer such a vacuum deposited SiO2 layer or an organic resin protective layer may be placed over the reflective material.

Optically variable adhesive 130 is preferably made of color-shifting adhesive, which can be controlled so that a color variation from one sample to another, ΔE, defined as the square root of the difference in hue squared plus the difference in chroma squared plus the difference in brightness squared, is less than 1.0, using color additive mixing of the optically variable pigments. However, in general a ΔE of being less than 3.0 is acceptable to the security field. This degree of color control cannot be achieved by optically variable foil since color control by additive mixing is not possible. Optionally, other materials such as fluorescent materials, phosphorescent and anti-stokes, dyes and other colorants can be added to the OVA.

Adhesive layer 132 having charms, taggants or pigment flakes therein, is substantially transparent to allow effects produced by OVA 130 to be visible therethrough; adhesive material of layer 132 can be clear or colored. Either the charms themselves are transparent or the concentration of the charms is sufficiently low to allow visibility of adhesive layer 130.

Optionally, magnetic flakes, such as metal flakes or OV flakes with a magnetic layer sandwiched between two layers of reflective material, are added to adhesive within layers 130 and 132, possibly in combination with non-magnetic optically variable flakes.

Relief structure 100, is embossed into the resin layer 106 covered with demet layer 102*a*, provides a demet holographic effect and includes such features as a double image hologram, a zero order hologram, a kinegram or other imagery based on grating technology. Demet layer 102*a* is patterned to provide visibility of OVA layer, when the security thread shown in FIG. 21 is viewed from the top. Layer 102*a* or 102*b* can be patterned with fine lines of lace-like pattern for providing an additional counterfeit feature, and/or with insignia 133*a*.

An image familiar to most people, such as famous statues of David and Venus de Milo, famous buildings including Eiffel Tower and Great Wall of China, famous people like Einstein, can be incorporated as a zero order diffractive image, allowing the common person to recognize and remember the device and authenticate it by combination of the image and the associated color shift.

The thread is protected from both sides, on one side by substrate 110, and on the other—by a hardcoat/resin layer 106.

When the thread is viewed at one side, the top as shown in FIG. 21, a color shifting effect of layer 130, a double image hologram or a zero order hologram 100, a demet lace-like pattern of aluminum 102*a* with indicia 133*a* and covert features such as "charms", are visible. When the thread is viewed from another side, a color shifting pattern showing the color shifting background 130 in the windows of layer 102*b*, surrounded by reflective aluminum 102*b*, is visible.

Advantageously, the overall thickness of the aforedescribed thread can be as low as 12μ, if the thread is made of 6 micron thick foil hot stamped and/or laminated to a 6μ PET. Multiple security effects within such a thin thread have previously not been achieved.

Another advantage of the aforedescribed thread is multiple technologies used to manufacture this thread. This makes counterfeiting difficult since the counterfeiter must have multiple skill sets to make a counterfeit. Holographic structure, optically variable pigment and demet Al on the PET could be made in separate and perhaps distant facilities and brought together at the point of currency manufacture to make the final product. The OVA weds all the components together. The idea of putting components together right before the security device is inserted into the currency paper gives added security to the device since interception of one component by during shipment gives the counterfeiting only one component of the overall device. Optionally, said prefabricated components have matching symbols, for example in the aluminum layer 102*b* and in the demet hologram 100 and 102*a*.

Moreover, fine lines of demet layer, such as lace-like pattern, in the hologram make it very difficult for a counterfeiter to reproduce the patterning using scissor, die cutting or even using photopolymers since precise registration is required in the demet process to align the demet patterns to the holographic features.

Additionally, the cost of putting text or other images into the aluminum layer next to the PET is negligible since an oil ablation demet in-line process in the vacuum roll coater can be used. Resolutions down to 70μ can be achieved.

Such a security thread can be used in banknotes as a windowed system where the thread is woven in and out the paper exposing itself in windows on either side of the note. It can also be embedded with in the paper itself where the paper is thin and transparent enough over the thread to still see the security features. Checks, passports, other security paper documents and plastic documents such a plastic based banknotes, credit cards and identity cards can utilize the aforedescribed security thread; it also can be used as a tear thread in such items as cigarette boxes and other secure packaging. In the case of paper documents, the viewing from both sides is affected by the thread passing to the surface of each side at regular or irregular intervals or at the same location if the paper is absent at that location.

Figure 22:
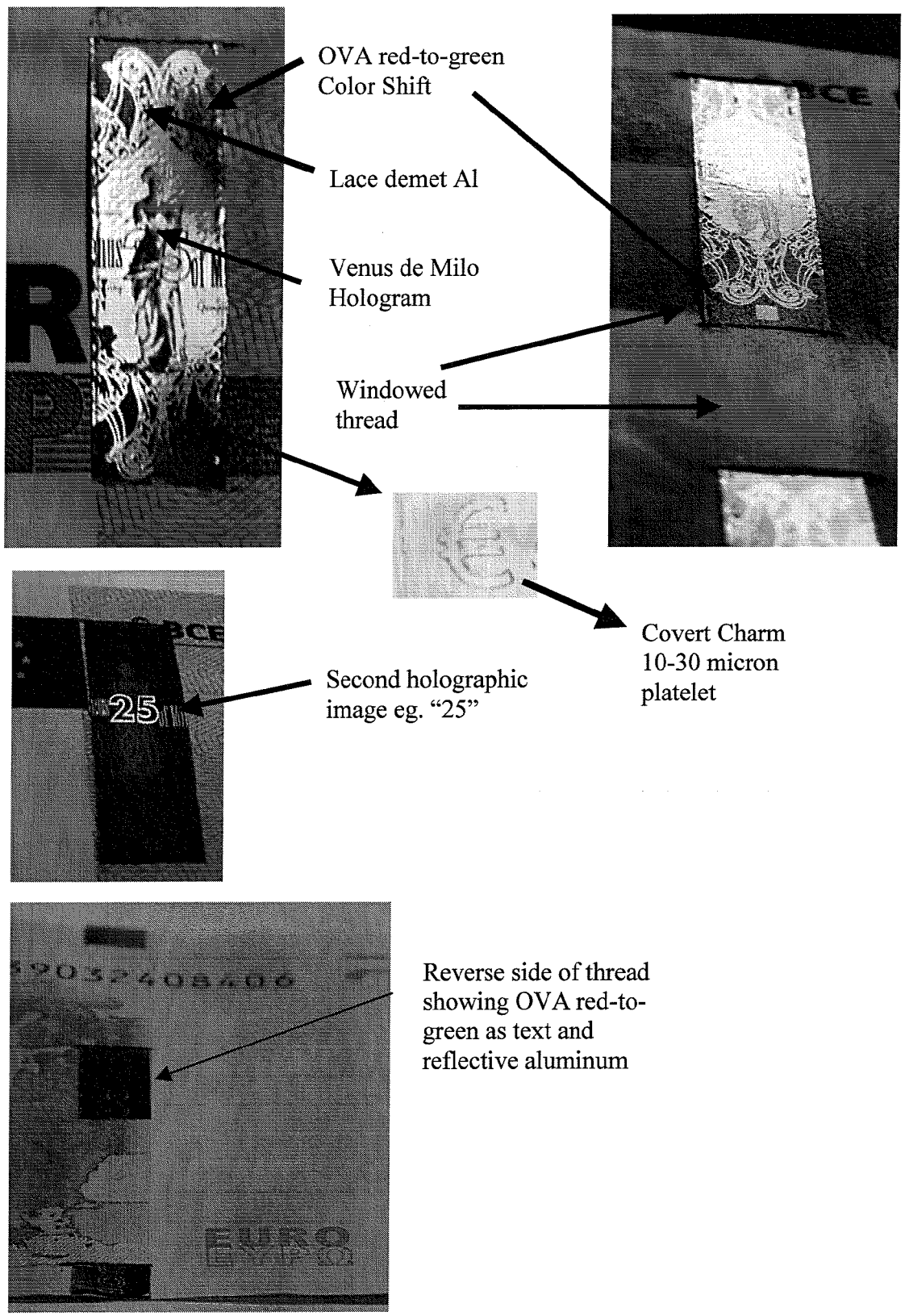
FIG. 22 is a set of photographs of a security thread according to the present invention.

FIG. 22 shows photographs of the security thread described in reference to FIG. 21.

Figure 23:
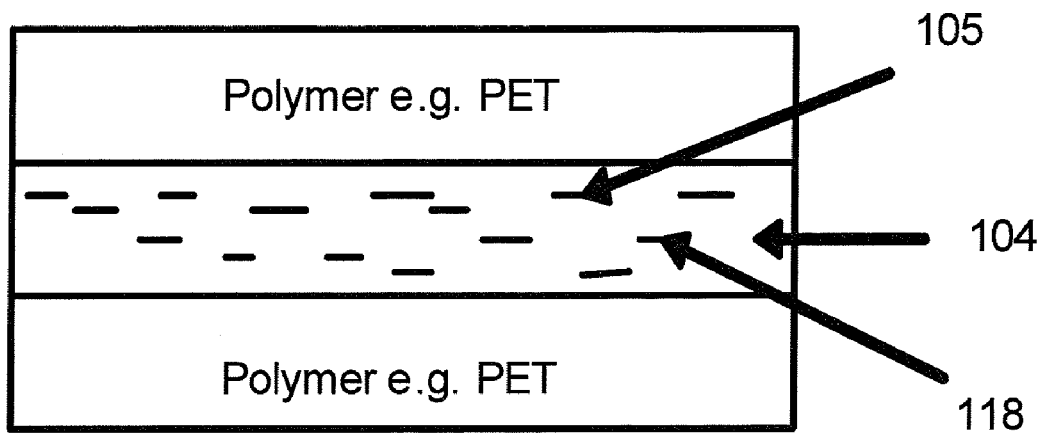
FIG. 23 is a cross-sectional view of a Laminate Security Thread using OVA according to one embodiment of the present invention.

FIG. 23 shows a Security Thread using OVA according to another embodiment of the present invention. The thread comprises two light-transmissive substrates, preferably made of PET, joined by OVA layer 104 having optically variable flakes 105 and covert taggants 118 therein.

Figure 24:
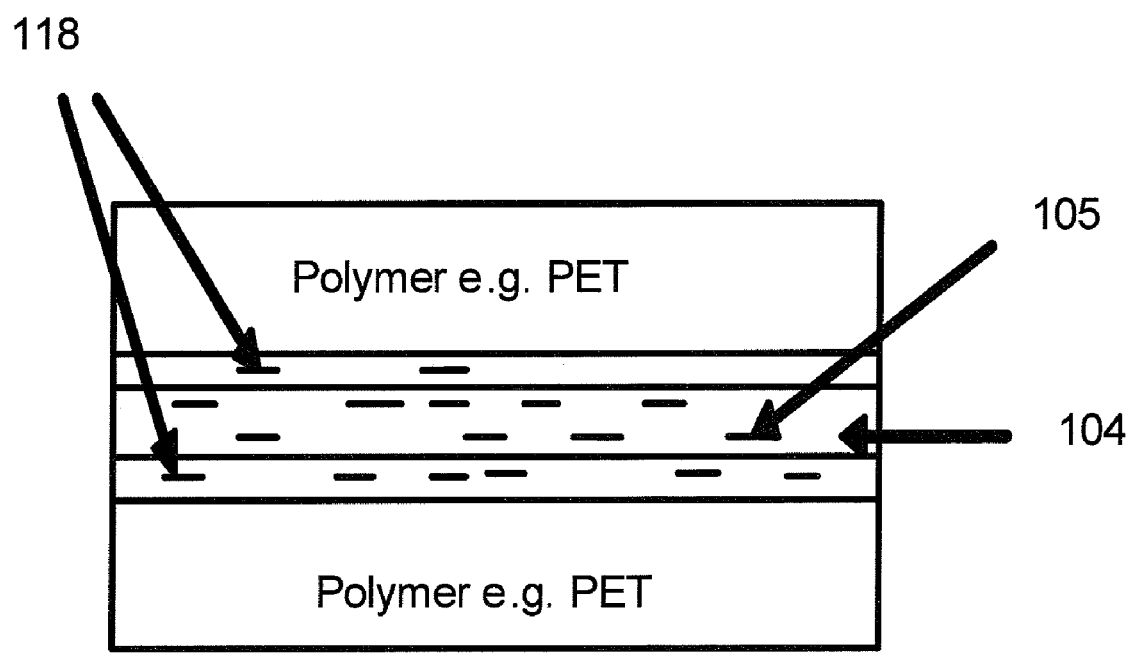
FIG. 24 is a cross-sectional view of a security thread wherein at least three layers of adhesive are used to laminate two substrates.
Figure 25:
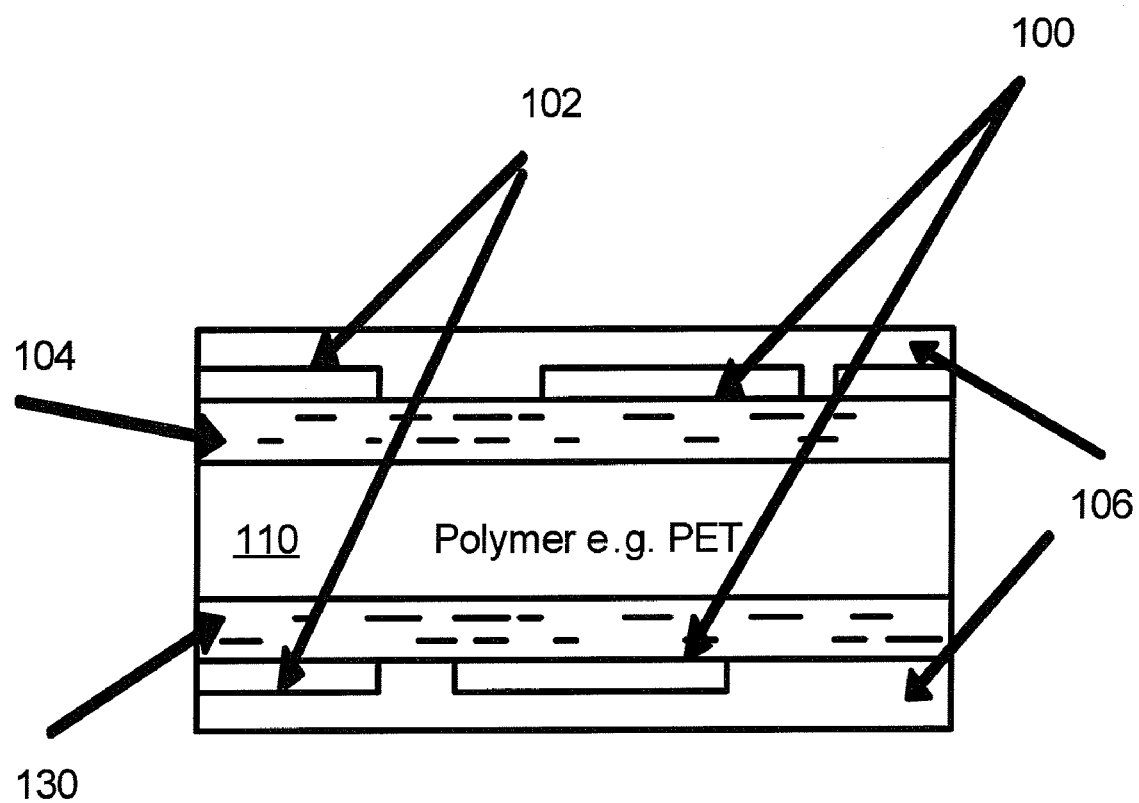
FIG. 25 is a cross-sectional view of a security thread wherein a substrate is laminated using two different OVA's.

Another embodiment of the present invention shown in FIG. 24 is a security thread wherein at least three layers of adhesive are used to laminate two substrates. The central layer OVA comprising a carrier 104 and pigment flakes 105, and two layers of adhesive with taggants 118 therein, the layers symmetrically disposed between the two substrates. Yet another embodiment is shown in FIG. 25, wherein a security thread comprises substrate 110 laminated using two different OVA's. Relief structures 100 are covered with demetallized Al 102 and hardcoat/resin layer 106. To manufacture such security thread, each side of a PET or other plastic substrate is hot stamped or roll nipped with a Chromagram, which is a demet hologram with OVA, wherein two OVAs differ in color and color shifting effect.

Prior art does not disclose such very thin security threads with OVA providing a layered system of counterfeit deterrence as described in reference to FIGS. 21-25.

In particular, in contrast to the aforementioned U.S. Pat. No. 4,186,943, our invention is asymmetric so that the thread appears different from each side providing an additional security feature.

Also, our invention improves color variation in comparison to U.S. Pat. No. 7,054,042, by mixing slightly different batches of optically variable pigment to get exact color and color shift time after time at least to less and or equal to a delta E of 1.0-3.0. Human perception can see color variation down to this level. Table 5 shows the variation calculated for such a Fabry Perot thin film foil at normal incidence using white light, for the design comprising an opaque Al layer, a low index MgF2 layer, and a 3 nm absorber layer made of Cr.

TABLE 5

Calculated Variation in Color for a 2% Variation in the Dielectric Thickness of a Fabry Perot Structure.

| Dielectric | a* | b* | L* | $\Delta E$ = Sq Root of $(\Delta a^{*2} + \Delta b^{*2} + \Delta L^{*2})$ |
|---|---|---|---|---|
| 4QW@550 nm | −18.16 | 73.908 | 87.96 | 27.4 |
| 4QW@561 nm | −4.082 | 69.098 | 86.597 | |
| 4QW@539 nm | −31.345 | 70.625 | 88.432 | |
| 6QW@550 nm | −14.757 | 19.862 | 81.992 | 31.47 |
| 6QW@561 nm | 8.58 | 7.272 | 81.033 | |
| 6QW@539 nm | −39.085 | 31.712 | 81.693 | |

The construction of the thread disclosed in the present application also provides a possibility to add covert materials (covert platelets and other pigments) which can not be done with '042. Furthermore, although '042 mentions patterning of the opaque aluminum it does not result in color shifting windows in the patterned aluminum as is the case for our invention. Removing some of the aluminum of the Fabry Perot filter disclosed in '042, would result in clear windows as the cavity of the Fabry Perot is destroyed. Furthermore, the device disclosed in '042 is really for only viewing from one side.

In comparison to U.S. Pat. No. 5,700,550, the invention of the present application allows for high chroma and high color control irrespective of the substrate color to which the device is affixed, and teaches the addition of covert taggents into the device.

In comparison to US Patent Application Publication No. 2005/0127663, this invention provides better color control of the OVA and thin gauge PET as it can easily be rolled with an OVA.

While the particular invention has been described with reference to illustrative embodiments, this description is not meant to be construed in a limiting sense. It is understood that although the present invention has been described, various modifications and combinations of the illustrative embodiments, as well as additional embodiments of the invention, will be apparent to one of ordinary skill in the art upon reference to this description without departing from the spirit of the invention, as recited in the claims appended hereto.

It is therefore contemplated that the appended claims will cover any such modifications or embodiments as fall within the true scope of the invention.

What is claimed is:

1. A structure for providing an optically variable effect, comprising a first substrate and a second substrate affixed to the first substrate by a hot-stamp adhesive alone, wherein the hot-stamp adhesive comprises an energy activated binder having a plurality of color shifting particles distributed therein for providing the optically variable effect detectable through the first substrate, wherein the color shifting particles change color with a change in angle of incident light.

2. A structure as defined in claim 1 wherein the first substrate has a relief structure thereon, and wherein the optically variable effect provided by the plurality of color shifting particles is externally visibly detectable through the relief structure.

3. A structure as defined in claim 2 wherein the relief structure is a diffractive structure that is one of: a hologram, a demetallized hologram, a kinegram, a zero order diffractive structure, and a grating structure.

4. A structure as defined in claim 3 wherein the diffractive structure is visible simultaneously with the optically variable effect, provided by the color shifting particles in the hot-stamp adhesive.

5. A structure as defined in claim 2 wherein the first substrate has a high refractive index layer disposed between the relief structure and the hot-stamp adhesive.

6. A structure as defined in claim 1 wherein one of the first and second substrates has at least one of: a thin film interference stack, a reflective coat, a high refractive index coat, and a patterned release layer thereon.

7. A structure as defined in claim 1 wherein the energy activated binder is selected from the group of: polymethacrylate, polyacrylate, polyamide, nitrocellulose, alkyd resin, polyvinyl alcohol, polyvinyl acetate, and polyurethane.

8. A structure as defined in claim 1 wherein the optically variable effect provided by the plurality of color shifting particles is detectable by a human eye.

9. A structure as defined in claim 1 wherein the plurality of color shifting particles comprises at least one of: magnetic material particles, and flakes having a length of at least 2 microns.

10. A structure as defined in claim 1 wherein the plurality of color shifting particles comprises flakes having a length of at least 2 microns, and wherein the flakes are at least one of: optically variable flakes, thin film light interference flakes, diffractive flakes, reflective flakes, light absorbing flakes, covert flakes, flakes bearing symbols or indicia, flakes that are uniform in shape, magnetic flakes, metal-dielectric flakes, all-dielectric flakes, mica based flakes, and liquid crystal based flakes.

11. A structure as defined in claim 1 wherein one of the first and second substrates is one of: a light transmissive substrate, an essentially transparent substrate, a Polyethylene Terephtalate (PET) substrate, a high refractive index coat, a protective coat, a release coat, and a piece of paper.

12. A structure as defined in claim 1 wherein the first substrate has at least one region not bound by the hot-stamp adhesive to the second substrate.

13. A structure as defined in claim 1 wherein the hot-stamp adhesive comprises a first and second adhesive sub-layers.

14. A structure as defined in claim 1 wherein the hot-stamp adhesive has a color variation from one sample to another of $\Delta E$, wherein $\Delta E$ is about 5.0 or less.

15. The structure as defined in claim 1 wherein the structure forms a security thread.

16. A method of forming a structure as defined in claim 1, comprising the steps of:
   a. providing a first substrate with an energy activated binder thereon, wherein the energy activated binder has a plurality of color shifting particles distributed therein for providing the optically variable effect detectable through the first substrate;
   b. disposing the first substrate adjacent to a second substrate without adding an adhesive therebetween, so that the energy activated binder is disposed between the first and second substrates; and
   c. curing the energy activated binder by hot stamping.

17. A method as defined in claim 16 wherein in step (b) at least one region of the second substrate is not covered by the energy activated binder, so that in step (c) said region is not bound to the first substrate.

18. A method as defined in claim 16 wherein in step (a) the first substrate is covered with a first energy activated binder having first particles distributed therein, and then covered with a second energy activated binder having second particles distributed therein or thereon, wherein the first particles or the second particles are the color shifting particles, and the first particles are different from the second particles.

19. A method as defined in claim 16 wherein in step (a) the energy activated binder is first applied to the first substrate, then the particles are added onto the surface of the energy activated binder, and then the added particles are covered with more of the energy activated binder.

20. The method as defined in claim 16 the particles are color-shifting or diffractive flakes.

21. The method as defined in claim 16 wherein first substrate has a diffractive structure thereon.

22. The structure as defined in claim 1 wherein the particles are color-shifting or diffractive flakes.

* * * * *